US010819416B2

(12) United States Patent
Martin et al.

(10) Patent No.: US 10,819,416 B2
(45) Date of Patent: Oct. 27, 2020

(54) APPARATUSES AND METHODS FOR USING ARQ PROCESSES IN A RELAY DEVICE

(71) Applicant: Sony Corporation, Tokyo (JP)

(72) Inventors: Brian Alexander Martin, Basingstoke (GB); Chrysovalantis Kosta, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/300,657

(22) PCT Filed: Apr. 27, 2017

(86) PCT No.: PCT/EP2017/060127
§ 371 (c)(1),
(2) Date: Nov. 12, 2018

(87) PCT Pub. No.: WO2017/194326
PCT Pub. Date: Nov. 16, 2017

(65) Prior Publication Data
US 2019/0288770 A1    Sep. 19, 2019

(30) Foreign Application Priority Data
May 13, 2016  (EP) .................................... 16169733

(51) Int. Cl.
*H04W 4/38* (2018.01)
*H04L 1/08* (2006.01)
(Continued)

(52) U.S. Cl.
CPC ........... *H04B 7/15557* (2013.01); *H04L 1/08* (2013.01); *H04L 1/1829* (2013.01);
(Continued)

(58) Field of Classification Search
None
See application file for complete search history.

(56) References Cited

U.S. PATENT DOCUMENTS

| 4,841,526 A | 6/1989 | Wilson et al. |
| 5,276,842 A | 1/1994 | Sugita |

(Continued)

FOREIGN PATENT DOCUMENTS

| WO | 2008/030050 A1 | 3/2008 |
| WO | 2009/158195 A2 | 12/2009 |

OTHER PUBLICATIONS

3GPP TS 36.322 V8.0.0 (Dec. 2007), Technical Specification, "3rd Generation Partnership Project; Technical Specification Group Radio Access Network; Evolved Universal Terrestrial Radio Access (E-UTRA) Radio Link Control (RLC) protocol specification (Release 8)," Dec. 2007, pp. 1-35.

(Continued)

*Primary Examiner* — Phung M Chung
(74) *Attorney, Agent, or Firm* — Xsensus LLP

(57) ABSTRACT

A communications device acting as a relay device configured to communicate with an infrastructure equipment of a mobile communications network and a receiving communications device operating with the mobile communications network. The communications device acting as the relay device comprises receives signals representing protocol data units formed from one or more service data units via a first wireless access interface from the infrastructure equipment according to a first automatic repeat request protocol for transmission to the receiving communications device, transmits signals representing the received protocol data units via a second wireless access interface to the receiving communications device according to a second automatic repeat request protocol, and stores, in a buffer, the protocol data units received from the infrastructure equipment according to the first automatic repeat request protocol.

20 Claims, 8 Drawing Sheets

(51) Int. Cl.
  *H04B 7/155* (2006.01)
  *H04L 1/18* (2006.01)
  *H04L 29/08* (2006.01)
  *H04L 29/06* (2006.01)
  *H04L 1/00* (2006.01)

(52) U.S. Cl.
  CPC .......... *H04L 1/1832* (2013.01); *H04L 1/1896* (2013.01); *H04L 67/12* (2013.01); *H04L 69/18* (2013.01); *H04W 4/38* (2018.02); *H04L 1/1822* (2013.01); *H04L 2001/0097* (2013.01)

(56) References Cited

U.S. PATENT DOCUMENTS

| | | | |
|---|---|---|---|
| 2008/0117877 A1 | 5/2008 | Min et al. | |
| 2019/0098647 A1* | 3/2019 | Webb | H04W 72/1242 |
| 2019/0166640 A1* | 5/2019 | Wei | H04W 88/04 |

OTHER PUBLICATIONS

China Telecom, "Discussion on UE Relay for eMBB and IoT," RP-160247, 3GPP TSG RAN Meeting #71, Göteborg, Sweden, Mar. 7-10, 2016, pp. 1-7.
ETSI TS 136 306 V10.2.0 (Jun. 2011), Technical Specification, LTE; Evolved Universal Terrestrial Radio Access (E-UTRA); User Equipment (UE) radio access capabilities (3GPP TS 36.606 version 10.2.0 Release 10), Jun. 2011, pp. 1-23.
Fairhurst, G. and Wood, L., "Advice to link designers on link Automatic Repeat reQuest (ARQ)," Network Working Group, Request for Comments: 3366, BCP: 62, Category: Best Current Practice, Copyright (C) The Internet Society (2002), pp. 1-28.
Holma, H. and Toskala, A., "LTE for UMTS: OFDMA and SC-FDMA Based Radio Access," First published: Mar. 31, 2009, © 2009 John Wiley & Sons, Ltd, Print ISBN:9780470994016, pp. 25-27.
Huawei, Hisilicon, "L2 UE-to-Network Relay for E-UTRAN," RP-160415, 3GPP TSG-RAN #71, Göteborg, Sweden, Mar. 7-10, 2016.
Intel, "Motivation for SI: Further LTE D2D Enhancements for Wearables and MTC," RP-160427, 3GPP TSG-RAN #71, Göteborg, Sweden, Mar. 7-10, 2016, pp. 1-14.
LG Electronics, "Motivation for New SI Enhancements of relayed COnnection via WLAN and LTE Sidelink (ECO)," RP-160241, pp. 1-7.
Qualcomm Incorporated, "New Work Item: NarrowBand Iot NB-IOT," RP-151621, 3GPP TSG RAN Meeting #69, Phoenix, USA, Sep. 14-16, 2015.
Qualcomm Incorporated, Intel, Huawei, Hisilicon, LG Electronics Inc., "New SI: Further Enhancements LTE Device to Device, UE to Network Relays for Wearables," RP-160677, 3GPP TSG RAN Meeting #71, Gothenburg, Sweden, Mar. 7-10, 2016, pages.
Qualcomm, "Motivation for SI proposal on Further Enhancements to LTE Device to Device," RP-160268, Agenda: 10.1.2, © 2013-2014 Qualcomm Technologies, Inc. and/or its affiliated companies, pp. 1-10.
ZTE, "Motivation for new Work Item on D2D communication for commercial use cases," RP-160283, 3GPP TSG RAN Meeting #71, Goteborg, Sweden, Mar 7-10, 2016, pp. 1-8.
International Search Report and Written Opinion for International Application No. PCT/EP2017/060127, dated Aug. 10, 2017.
European Communication Pursuant to 94(3) dated Jul. 24, 2020 in European Application No. 17720473.2.

* cited by examiner

APPARATUSES AND METHODS FOR USING ARQ PROCESSES IN A RELAY DEVICE

CROSS-REFERENCE TO RELATED APPLICATIONS

This application is a National Stage Application based on PCT/EP2017/060127, filed 27 Apr. 2017, and claims priority to European Patent Application No. 16169733.9, filed 13 May 2016, the entire contents of which being incorporated herein by reference.

BACKGROUND

Field of Disclosure

The present disclosure relates to communications devices acting as relay devices which is configured to relay signals comprising protocol data units (PDUs) from an infrastructure equipment to another communications device in a mobile communications network.

Embodiments of the present disclosure can provide communications devices acting as relay devices and methods of operating communications devices acting as relay devices which are operable to optimise user-plane relaying operation at the radio link control (RLC) layer.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

According to embodiments of the present disclosure, there is provided a communications device acting as a relay device configured to communicate with an infrastructure equipment of a mobile communications network and a receiving communications device operating with the mobile communications network. The communications device acting as the relay device comprises a receiver configured to receive signals representing protocol data units formed from one or more service data units via a first wireless access interface from the infrastructure equipment according to a first automatic repeat request protocol for transmission to the receiving communications device, a transmitter configured to transmit signals representing the received protocol data units via a second wireless access interface to the receiving communications device according to a second automatic repeat request protocol, a controller configured to control the transmitter to transmit the signals and to control the receiver to receive the signals to transmit, and a buffer configured to store the protocol data units received by the receiver from the infrastructure equipment according to the first automatic repeat request protocol. The controller is configured in combination with the transmitter, the receiver and the buffer to transmit according to the second automatic repeat request protocol the protocol data units received from the infrastructure equipment from the buffer to the receiving communications device.

According to embodiments of the present disclosure, upon receiving acknowledgement or negative acknowledgement signals from the receiving communications device according to the second automatic repeat request process, the communications device acting as the relay device may advance a sliding window of the buffer in order to clear space for the reception of future protocol data units according to the first automatic repeat request process. The communications device acting as the relay device is configured to advance the sliding window by an amount equal to a sequence number of the received protocol data units, which are transmitted by the infrastructure equipment in a predetermined order.

In embodiments of the present disclosure, the communications device acting as the relay device may, in response to a status request message from the infrastructure equipment, transmit to the infrastructure equipment an indication of protocol data units which have not been successfully received.

Embodiments of the present technique may also include the relaying of signals on the uplink received by the communications device acting as the relay device from a transmitting communications device and relayed to the infrastructure equipment, or the D2D relaying of signals between two communications devices.

Embodiments of the present technique can provide arrangements in which a communications device is able to operate as a relay device between a second, low power device and an infrastructure equipment. The communications device acting as the relay device is configured to have a single, transient, transmit and receive buffer, and as such to reduce delay and processing overheads. In addition, introducing a combination of functions currently present in the reception and transmission RLC window management, the quality of both radio links, between the infrastructure equipment and the relay and between the relay and receiving communications device can be taken into account. The relay device can receive and transmit simultaneously, and since it is not necessary to copy data from one buffer to another, nor to perform any reassembly, processing effort can be minimised. Embodiments of the present technique can therefore save power at the relay device by optimising user-plane relaying operation at the RLC layer.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System and Relay Nodes

Figure 1:
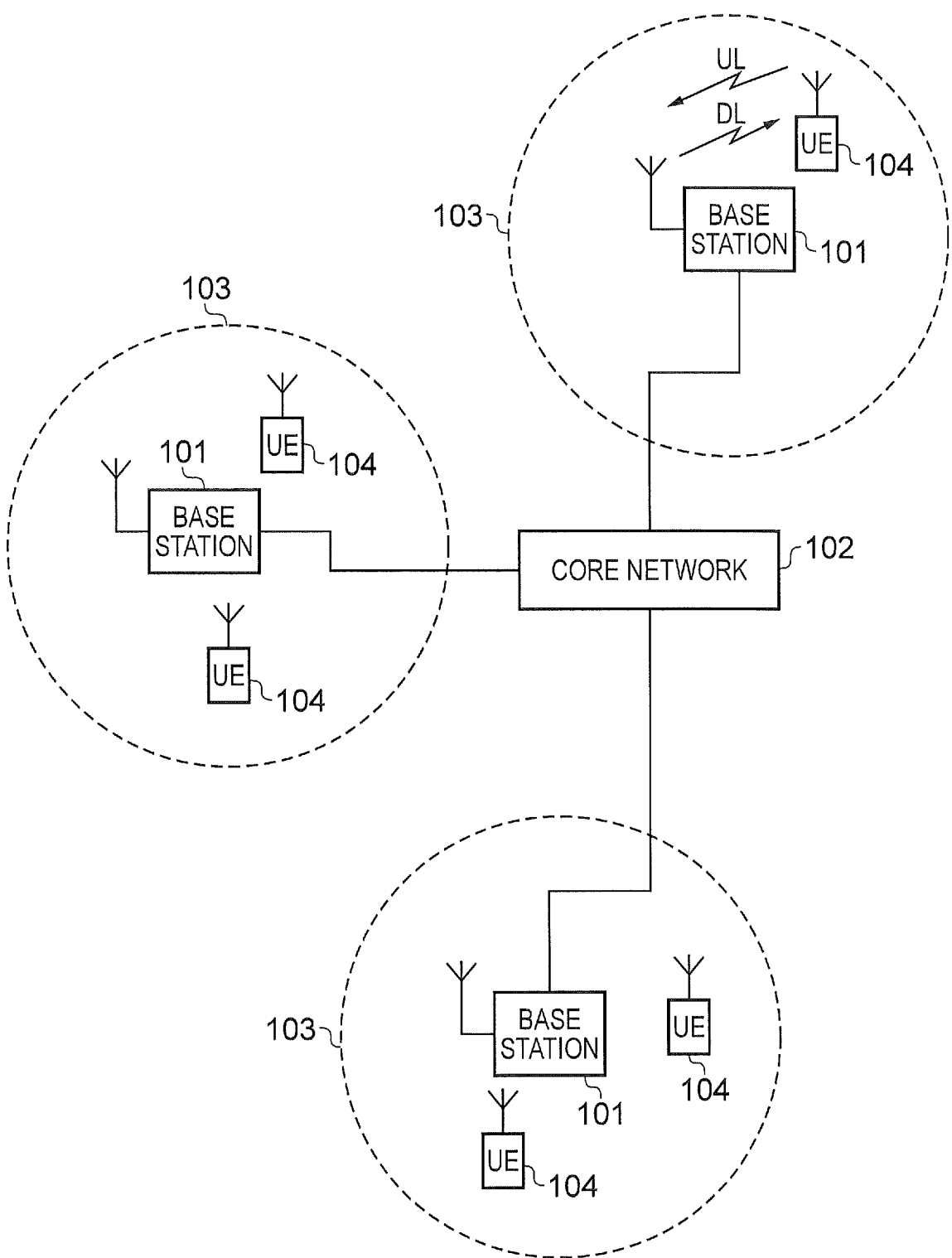
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include relay nodes, to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced, as the range of transmission for that terminal will be reduced.

Figure 2:
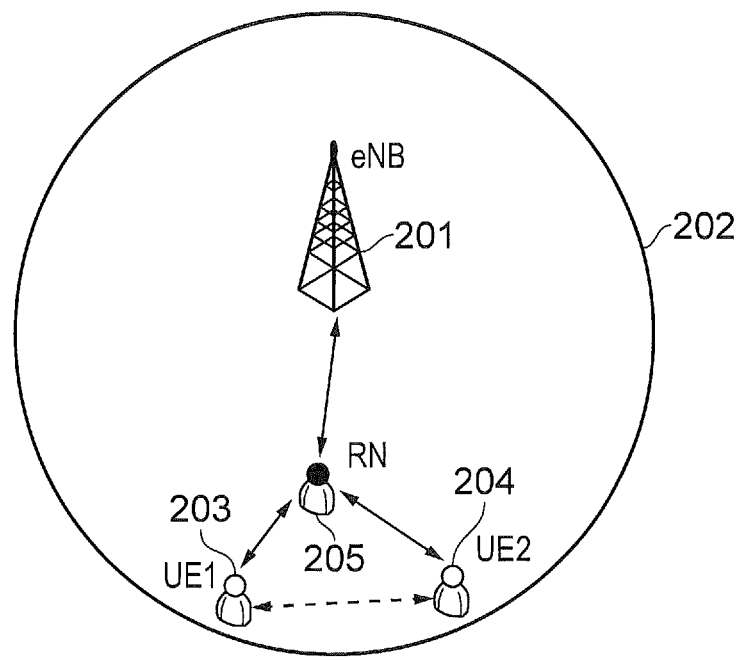
FIG. 2 illustrates an example of D2D communications using a relay node.

FIG. 2 illustrates an example network comprising an eNodeB 201 with a coverage area 202. Two UEs 203 and 204 may communicate with one another using device-to-device (D2D) communications. To communicate with the eNodeB 201, each of the UEs 203 and 204 communicate with a relay node 205, which then relays signals to and from the eNodeB 201. In the example of FIG. 2, both UEs 203 and 204 are inside the coverage area 202 of the eNodeB 201, so signals are not necessarily being relayed for coverage purposes. For example, the UEs 203 and 204 may be low power devices, and so communicating with the relay node 205 consumes less power (as communications are over a shorter range) than communicating directly with the eNodeB 201 would do.

A relay node can generally be defined as a wireless radio access point for relaying transmission and which thus does not implement all of the functionalities of a base station. It is in general not directly connected to the core network but uses wireless access (inband or outband) for backhaul link to connect with a base station.

In other examples, the backhaul link may also be provided over a wired connection. Relay technologies are known generally to provide an arrangement for receiving signals from a base station and for retransmitting the received signals to a UE in a mobile communications network, or to receive signals transmitted from a UE for re-transmission to a base station of a mobile communications network.

Narrowband Internet of Things and Machine Type Communications

In 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilising for example the spectrum currently being used by GERAN systems as a replacement of one or more GSM carriers
2. 'Guard band operation' utilising the unused resource blocks within a LTE carrier's guard-band
3. 'In-band operation' utilising resource blocks within a normal LTE carrier One of the objectives of NB-IoT is to allow the cost of devices to be as low as possible. This is also an objective of Low Complexity Machine Type Communication (LC-MTC). LC-MTC terminal devices (UEs) also implement new LTE features which are currently being specified in 3GPP. The main features of LC-MTC UE are low complexity (and therefore low cost), coverage enhancement and reduced power consumption.

Wearable devices (such as smartwatches and the like) are examples of devices which may make use of NB-IoT or LC-MTC communications systems. In 3GPP Rd. 14 a study item into further enhancements to LTE D2D communications, network relays for IoT and wearable devices has been approved [3], including the enhancement of D2D to be more suitable for lower cost/complexity (e.g. wearable) devices. The first phase of the study will evaluate scenarios and requirements with the intention of refining and updating current objectives. In addition to this, it has been agreed that relay technologies will form part of the future work on new radio access technology (RAT) for fifth generation (5G) wireless communication systems. It is anticipated that enhancements made to LTE D2D will also be applicable to these 5G systems.

Employment of Relay Nodes for Wearable Devices

One of the benefits of connecting indirectly to the network via a relay is that a remote device (e.g. a wearable device such as a smart watch) may reduce its power consumption, since uplink transmissions can be performed at a much shorter range to the relay device, rather than to the eNodeB. One potential realisation of this would be to utilise a narrowband channel similar to eMTC or NB-IoT for the relay link. This would be suitable for sending (and also potentially receiving) small amounts of data via the relay. Another possibility would be to use Bluetooth or Wi-Fi for the relay link (sidelink).

Figure 3:
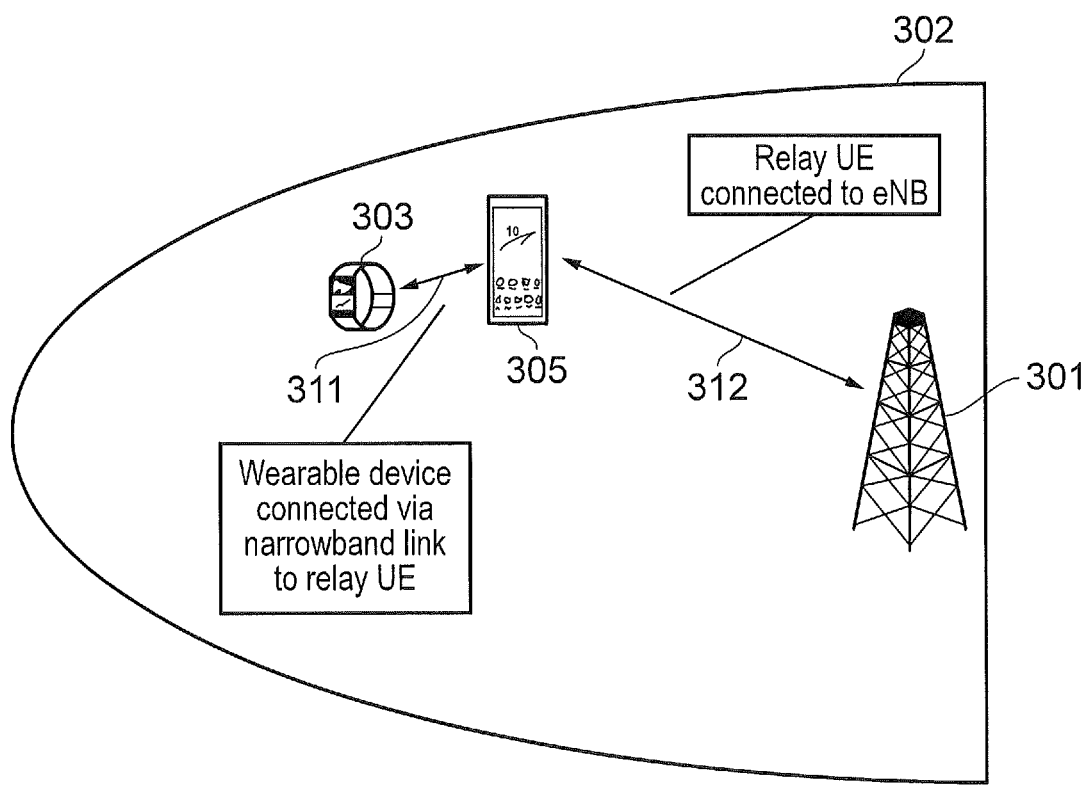
FIG. 3 illustrates an example scenario in which a remote wearable device may communicate with an eNodeB using a communications device as a relay node.

FIG. 3 illustrates an example scenario in which a remote wearable device 303 may communicate with an eNodeB 301 using a communications device 305 as a relay node. The eNodeB 301 has a coverage area 302, which the remote wearable device 303 and communications device 305 are within. The remote wearable device 303 is connected by a narrowband link 311 to the communications device 305, and the communications device is connected by a conventional link 312 to the eNodeB 301. The remote wearable device 303 may be, for example, a smartwatch, while the communications device 305 may be, for example a smartphone. The owner of the smartwatch may also own the smartphone, or alternatively, they may be owned by separate users.

The wearables study has so far considered power saving and complexity reduction for the remote (wearable) device 303. However, it is also important to optimise and simplify the functionality of the relay device 305. Particularly when the relay device 305 is a smartphone, power consumption and processing load is extremely important, because the user will notice a reduction in performance of the device when wearables are connected and will impact the overall experience. Particularly if use consent is needed for a third party wearable device to connect then this is unlikely to be enabled if there is a significant or noticeable difference in performance. Embodiments of the present disclosure attempt to optimise user-plane relaying operation at the radio link control (RLC) layer.

Current RLC Model for LTE and State Variables

Figure 4:
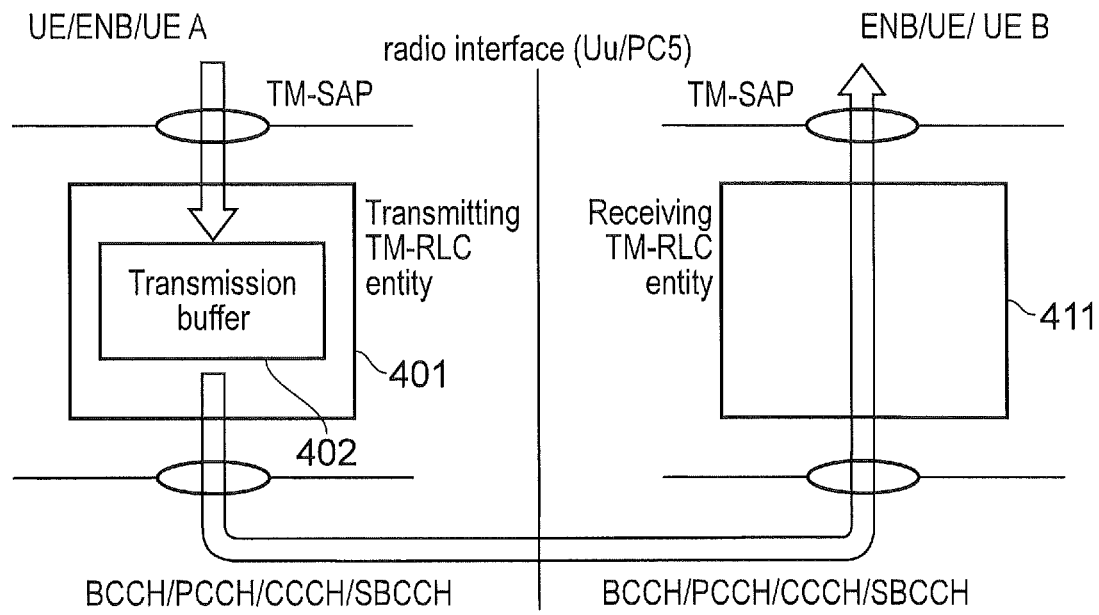
FIG. 4 shows a model of two transparent mode peer entities in accordance with the 3GPP LTE RLC specification.
Figure 5:
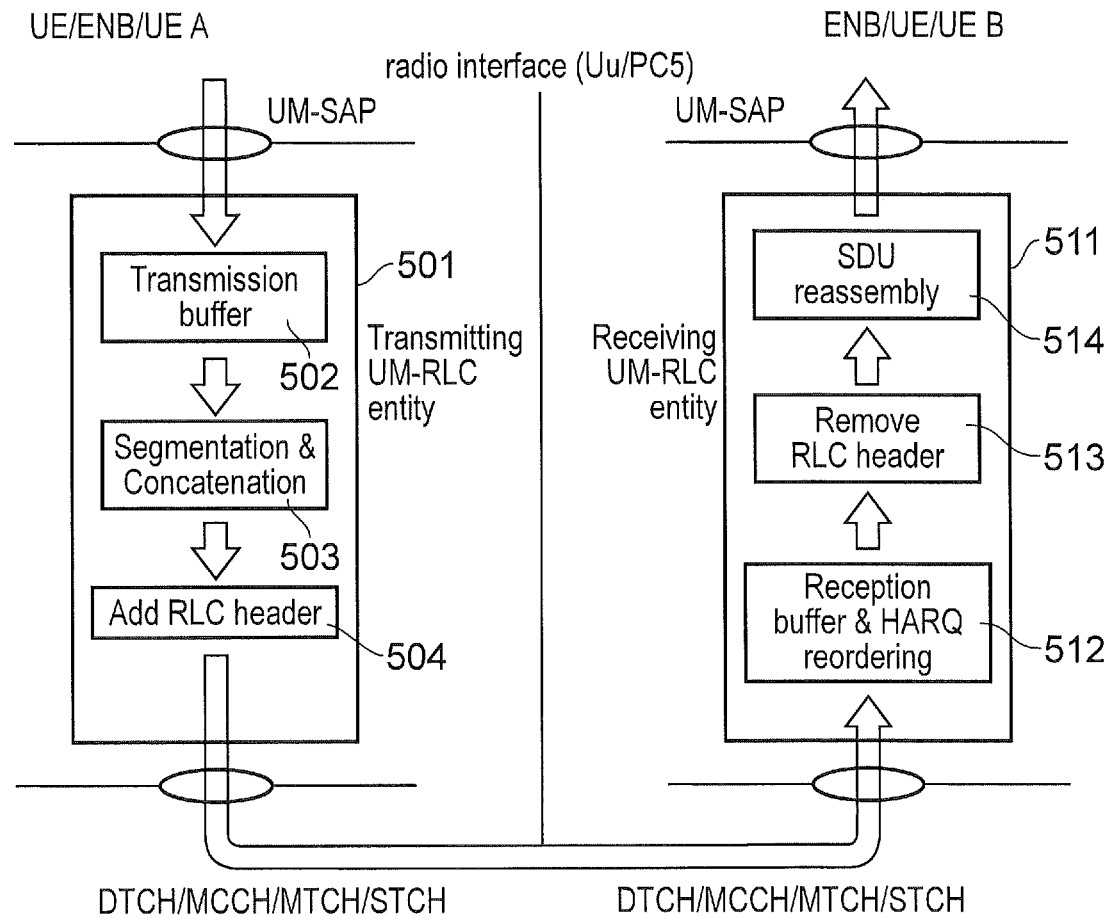
FIG. 5 shows a model of two unacknowledged mode peer entities in accordance with the 3GPP LTE RLC specification.
Figure 6:
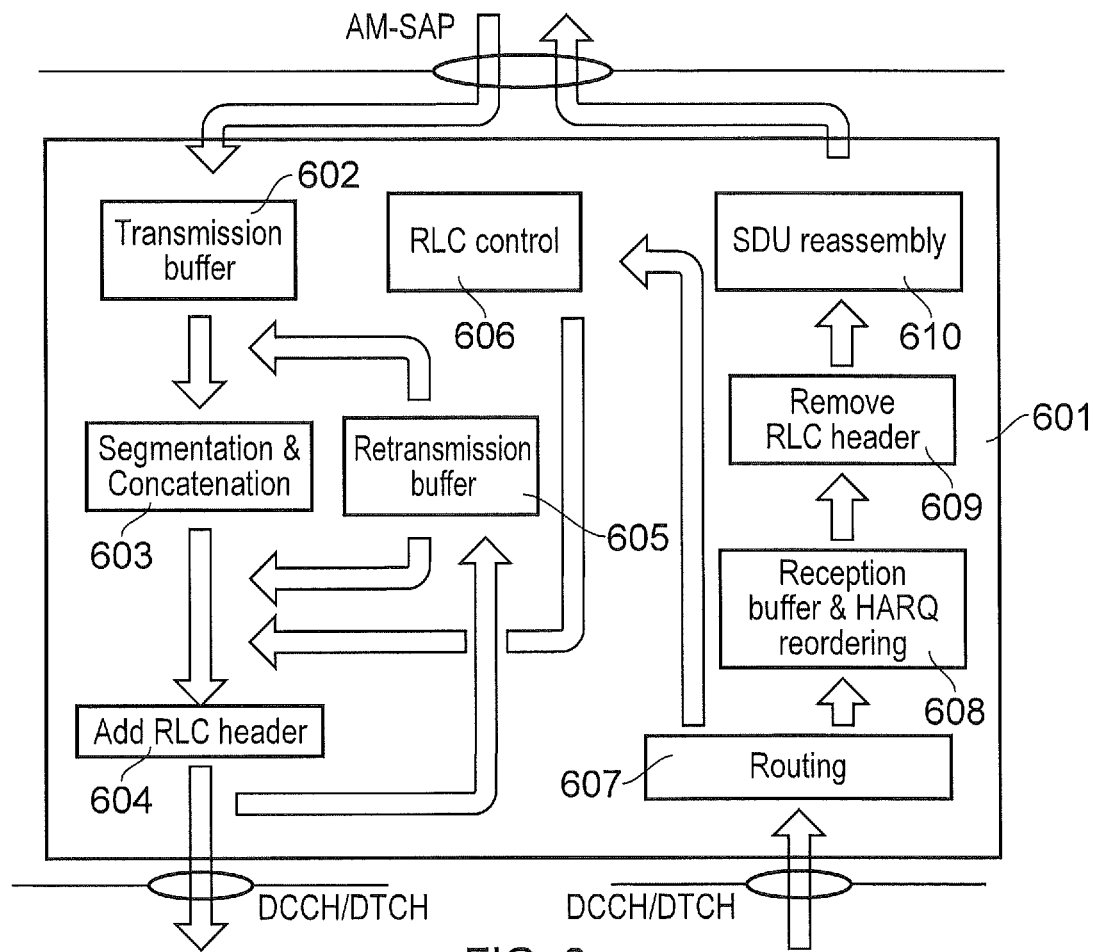
FIG. 6 shows a model of an acknowledged mode entity in accordance with the 3GPP LTE RLC specification.

FIGS. 4 to 6, which are described in detail in the following paragraphs, are taken from the 3GPP TS 36.322 specification [4] defining the RLC layer (layer 2) for LTE. A more detailed description may be found by referring to subclause 4.2 of the same specification, which contains a textual description of the architecture and the main functions performed by the entities shown in FIGS. 4 to 6. Some of the textual description from [4] is used in the description of FIGS. 4 to 6 in the following paragraphs.

FIG. 4 shows a transmitting transparent mode (TM) RLC entity 401, which comprises a transmission buffer 402. The transmitting TM RLC entity 401 is configured to transmit TM data protocol data units (TMD PDUs) formed from RLC service data units (RLC SDUs) (without segmenting or concatenating the RLC SDUs or including any RLC headers in the TMD PDUs) to a receiving TM RLC entity 411.

FIG. 5 shows a transmitting unacknowledged mode (UM) RLC entity 501, which comprises a transmission buffer 502, segmentation and concatenation means 503 and RLC header addition means 504. The transmitting UM RLC entity 501 is configured to segment and/or concatenate 503 the RLC SDUs so that the UMD PDUs fit within the total size of RLC PDU(s) indicated by a lower layer at the particular transmission opportunity notified by lower layer, and to include relevant RLC headers 504 in the UMD PDU, before transmitting the UMD PDUs to a receiving UM RLC entity 511. The receiving UM RLC entity 511 comprises a reception buffer 512 which may carry out re-ordering in accordance with a hybrid automatic repeat request (HARQ) protocol, RLC header removal means 513 and SDU reassembly means 514. Upon reception for the UMD PDUs the receiving UM RLC entity 511 is configured to detect whether or not the UMD PDUs have been received in duplication, and discard duplicated UMD PDUs, reorder the UMD PDUs if they are received out of sequence, detect the loss of UMD PDUs at lower layers and avoid excessive reordering delays, reassemble RLC SDUs from the reordered UMD PDUs (not accounting for RLC PDUs for which losses have been detected) and deliver the RLC SDUs to upper layer in ascending order of the RLC sequence number (SN), and discard received UMD PDUs that cannot be re-assembled into a RLC SDU due to loss at lower layers of an UMD PDU which belonged to the particular RLC SDU. At the time of RLC re-establishment, the receiving UM RLC entity shall if possible, reassemble RLC SDUs from the UMD PDUs that are received out of sequence and deliver them to upper layer, discard any remaining UMD PDUs that could not be reassembled into RLC SDUs and initialise relevant state variables and stop relevant timers.

FIG. 6 shows an acknowledged mode (AM) RLC entity 601, comprising a transmission buffer 602, segmentation and concatenation means 603, RLC header addition means 604, retransmission buffer 605, RLC control means 606, routing means 607, a reception buffer 608 which may carry out re-ordering in accordance with a HARQ protocol, RLC removal means 609 and SDU reassembly means 610. When a transmitting side of an AM RLC entity forms AMD PDUs from RLC SDUs, it shall segment and/or concatenate the RLC SDUs so that the AMD PDUs fit within the total size of RLC PDU(s) indicated by lower layer at the particular transmission opportunity notified by lower layer. The transmitting side of an AM RLC entity supports retransmission of RLC data PDUs (ARQ) if the RLC data PDU to be retransmitted does not fit within the total size of RLC PDU(s) indicated by lower layer at the particular transmission opportunity notified by lower layer, the AM RLC entity can re-segment the RLC data PDU into AMD PDU segments and the number of re-segmentation is not limited. When the transmitting side of an AM RLC entity forms AMD PDUs from RLC SDUs received from upper layer or AMD PDU segments from RLC data PDUs to be retransmitted, it shall include relevant RLC headers in the RLC data PDU. When the receiving side of an AM RLC entity receives RLC data PDUs, it shall detect whether or not the RLC data PDUs have been received in duplication, and discard duplicated RLC data PDUs, reorder the RLC data PDUs if they are received out of sequence, detect the loss of RLC data PDUs at lower layers and request retransmissions to its peer AM RLC entity and reassemble RLC SDUs from the reordered RLC data PDUs and deliver the RLC SDUs to upper layer in sequence. At the time of RLC re-establishment, the receiving side of an AM RLC entity shall if possible, reassemble RLC SDUs from the RLC data PDUs that are received out of sequence and deliver them to upper layer, discard any remaining RLC data PDUs that could not be reassembled into RLC SDUs and initialise relevant state variables and stop relevant timers.

State variables are also discussed in [4]. The transmit and receive AM variables (in section 7.1 of [5]) are re-used in embodiments of the present technique—both sets of variables apply to the relay window. In addition, the relay can report the acknowledgement state variable VT(A) from its transmission window status to the eNodeB in order to indicate buffer use (the eNodeB can calculate, from its own variables along with this reported information about the relay's transmit window, how full the relay buffer is).

As described in [4], the transmitting side of each AM RLC entity shall maintain the following state variables:

a) VT(A)—Acknowledgement State Variable

This state variable holds the value of the SN of the next AMD PDU for which a positive acknowledgment is to be received in-sequence, and it serves as the lower edge of the transmitting window. It is initially set to 0, and is updated whenever the AM RLC entity receives a positive acknowledgment for an AMD PDU with SN=VT(A).

In embodiments of the present disclosure, it is anticipated that this variable is used in the relay RLC to determine how and when to advance the window. It may also be reported in some embodiments to the original transmitting entity to provide an indication of window usage/buffer occupancy.

b) VT(MS)—Maximum Send State Variable

This state variable equals VT(A)+AM_Window_Size, and it serves as the higher edge of the transmitting window.

In embodiments of the present disclosure, it is also anticipated that this variable is used. It is not strictly necessary however to report it to the original transmitting entity, because it can be calculated from the acknowledgement state variable and the window size.

c) VT(S)—Send State Variable

This state variable holds the value of the SN to be assigned for the next newly generated AMD PDU. It is initially set to 0, and is updated whenever the AM RLC entity delivers an AMD PDU with SN=VT(S).

In embodiments of the present disclosure, this variable has to be used when transmitting new PDUs.

d) POLL_SN—Poll Send State Variable

This state variable holds the value of VT(S)-1 upon the most recent transmission of a RLC data PDU with the poll bit set to "1". It is initially set to 0.

In some embodiments of the present disclosure, this state variable is not used at the relay RLC—these embodiments are the ones (described in detail in the following pages) in which the original transmitter carries out all of the polling. Other embodiments of the present disclosure do use this state variable (e.g. when the relay RLC does its own polling).

The transmitting side of each AM RLC entity shall maintain the following counters:

a) PDU_WITHOUT_POLL—Counter

This counter is initially set to 0. It counts the number of AMD PDUs sent since the most recent poll bit was transmitted.

b) BYTE_WITHOUT_POLL—Counter

This counter is initially set to 0. It counts the number of data bytes sent since the most recent poll bit was transmitted.

The above two counters are related to polling and so as with regard to the poll send state variable POLL_SN on the transmitting side of each AM RLC entity, it is used in some embodiments of the present disclosure, but not in all.

c) RETX_COUNT—Counter

This counter counts the number of retransmissions of an AMD PDU (see subclause 5.2.1). There is one RETX_COUNT counter per PDU that needs to be retransmitted.

The receiving side of each AM RLC entity shall maintain the following state variables:

a) VR(R)—Receive State Variable

This state variable holds the value of the SN following the last in-sequence completely received AMD PDU, and it serves as the lower edge of the receiving window. It is initially set to 0, and is updated whenever the AM RLC entity receives an AMD PDU with SN=VR(R).

b) VR(MR)—Maximum Acceptable Receive State Variable

This state variable equals VR(R)+AM_Window_Size, and it holds the value of the SN of the first AMD PDU that is beyond the receiving window and serves as the higher edge of the receiving window.

c) VR(X)—t-Reordering State Variable

This state variable holds the value of the SN following the SN of the RLC data PDU which triggered t-Reordering.

d) VR(MS)—Maximum STATUS Transmit State Variable

This state variable holds the highest possible value of the SN which can be indicated by "ACK_SN" when a STATUS PDU needs to be constructed. It is initially set to 0.

e) VR(H)—Highest Received State Variable

This state variable holds the value of the SN following the SN of the RLC data PDU with the highest SN among received RLC data PDUs. It is initially set to 0.

In embodiments of the present disclosure, these receive variables may be used to determine when to trigger a status report to the transmitting device. Other alternatives would be to modify the behaviour such that only the destination (e.g. the remote UE) uses these variables, and status PDUs are relayed back to the original sender. Another alternative is that instead of t-reordering, the relay checks after a fixed number of PDUs.

Layer 2 Relay

An advantage of having a relay at the RLC layer (layer 2) is data can be forwarded from the source to the target device without the data being decodable by the relay device—this is also one of the key requirements of the relay work. Access stratum (AS) security (ciphering and deciphering) is handled at the packet data convergence protocol (PDCP) layer, which sits directly above the RLC layer in layer 2 of the protocol stack. The RLC layer provides crucial ARQ functionality which is necessary to provide reliability. The RLC ARQ functionality corrects residual errors present after medium access control (MAC) layer HARQ corrections. HARQ in MAC provides a fast feedback mechanism which aims to reduce delay while correcting most of the errors with a small amount of overhead, while the ARQ provides a slower feedback mechanism which is necessary to provide robustness—ARQ has a larger overhead since the control PDUs are of a larger size, but since they are transmitted using HARQ, the feedback itself is more reliable.

Figure 7:
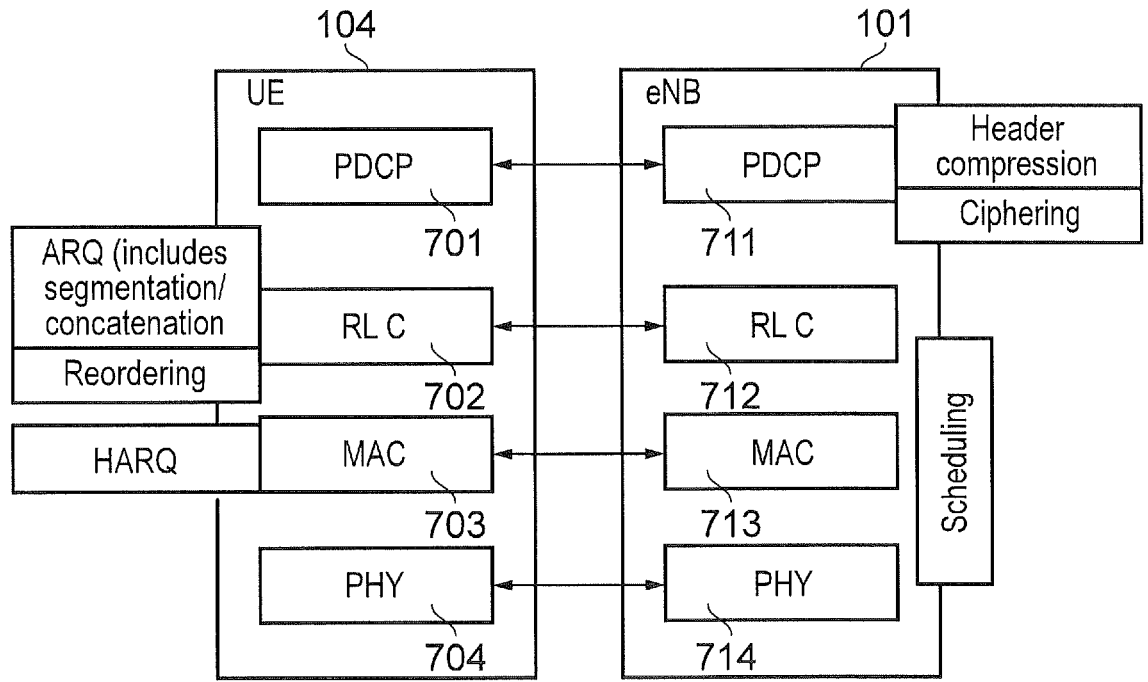
FIG. 7 displays diagrammatically the user-plane architecture for LTE systems.

The user-plane protocol architecture is shown in FIG. 7. Protocol architecture of a UE 104 comprises, at layer 2 of the protocol stack, a PDCP layer 701, an RLC layer 702 and a MAC layer 703, all above the physical layer 704 at layer 1 of the protocol stack. Likewise, protocol architecture of an eNodeB 101 comprises, at layer 2 of the protocol stack, a PDCP layer 711, an RLC layer 712 and a MAC layer 713, all above the physical layer 714 at layer 1 of the protocol stack. Data is able to be communicated between the PDCP layer 701 of the UE 104 and the PDCP layer 711 of the eNodeB 101, between the RLC layer 702 of the UE 104 and the RLC layer 712 of the eNodeB 101, between the MAC layer 703 of the UE 104 and the MAC layer 713 of the eNodeB 101 and between the physical layer 704 of the UE 104 and the physical layer 714 of the eNodeB 101.

As such—an obvious choice for a layer 2 relay would be to perform relaying functionality either at a PDCP entity before de-ciphering, or at an interface between an RLC entity and the PDCP entity. This is because the data needs to be forwarded before being de-ciphered, while the existing RLC functionality can be re-used in both the receive side operation and the transmit side operation.

However, a number of issues have been identified with re-using RLC, and in particular AM RLC. These include that the relay device needs to reserve two buffers—one for receiving and another for transmitting. The reception buffer is needed in order to store PDUs so that complete SDUs can be passed to the upper layer (or in the relay case, to be passed to the transmitting RLC). The transmission buffer is needed in case the receiver (a remote UE) transmits a negative acknowledgement (NACK) in response to any PDU transmission and so the transmitter needs to re-transmit. Each of those buffers needs to be managed using a polling mechanism, status reporting, and sliding window. This means that additional memory is required, as two buffers are needed to relay uplink data, and another two buffers are needed to relay downlink data.

Another issue is that a delay is introduced. In a case in which the RLC entity segments SDUs into multiple PDUs (in the normal case—RLC PDU size is set according to the transport block size determined by MAC layer, which is determined based on the channel conditions (smaller PDU when channel conditions are poorer—larger PDU when channel conditions are good)), the relay needs to wait for all PDUs of an SDU before it can be forwarded, which can introduce several milliseconds of delay.

There is an issue in regards to the processing requirement. The receiver needs to reassemble SDUs, remove headers, copy from reception to transmission buffer, then segment and transmit according to the forward link. Any extra processing implies power consumption.

There is a further issue with regard to protocol stalling. Taking the example of a high speed link from the eNodeB to the relay, and a lower speed link from the relay to the remote UE, the likelihood is that the relay buffer will become full because data cannot be sent out of the relay as quickly as it is received. When the buffer becomes full, no more data can be transmitted. This is known as protocol stalling. The eNodeB transmitting entity needs to be able to slow down transmission if the relay transmit buffer cannot transmit more data in order to clear the queue of data waiting to be sent before more data is received.

Single Buffer RLC for Relay

In embodiments of the present disclosure, a new type of RLC entity is introduced, which is specifically for relaying data. The RLC entity has a combined receive/transmit buffer which is managed simultaneously by keeping track of successfully transmitted PDUs and successfully received PDUs in the same buffer. Most of the RLC state variables, polling mechanism, and sliding window mechanism which exist today in the transmission and reception RLC operations are maintained, but the behaviour is combined to operate a single buffer (e.g. "transient buffer").

By combining the reception and transmission buffers in the relay, buffer requirement can be addressed, and delay and processing overheads can be reduced. In addition, introducing a combination of functions currently present in the reception and transmission RLC window management, the quality of both radio links can be taken into account.

The RLC entity can receive and transmit simultaneously, and since the receiver does not need to reassemble SDUs before forwarding the data, the delay introduced by the relay entity is reduced to a single transmission time interval (TTI) (1 ms) regardless of the size of individual SDUs or PDUs because each PDU can be forwarded in the TTI after it was received, as long as the forward radio link conditions are acceptable. Since it is not necessary to copy data from one buffer to another, nor to perform any reassembly, processing effort can be minimised. Further to this, since only one buffer is necessary, the memory requirement is minimised.

In addition, embodiments of the present disclosure describe a number of approaches for polling strategy and RLC window management.

Figure 8:
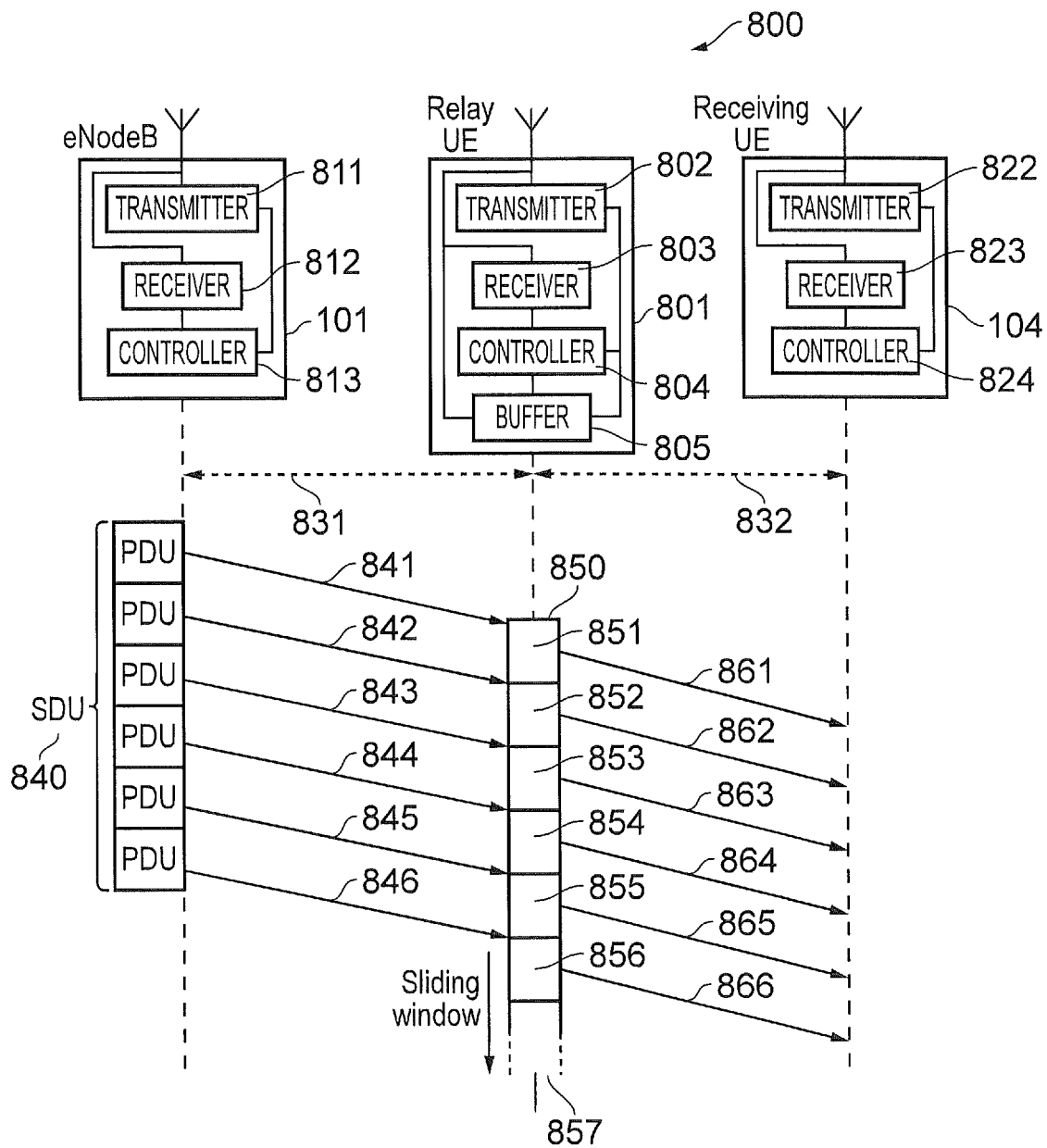
FIG. 8 is a part schematic representation, part message flow diagram of communications between a UE, an eNodeB and a relay node in accordance with embodiments of the present disclosure.

FIG. 8 is a part schematic block diagram of a communications device acting as a relay device 801, a receiving communications device 104 operating with a mobile communications network 800 and an infrastructure equipment 101 of the mobile communications network 800, and part message flow diagram illustrating a process of communications between the communications device acting as the relay device 801, the receiving communications device 104 and the infrastructure equipment 101 and a relay node 431 in accordance with embodiments of the present disclosure. Each of the infrastructure equipment 101, communications device acting as the relay device 801, and receiving communications device 104 comprise a transmitter 401, 802, 411, a receiver 402, 803, 412 and a controller 403, 804, 413 to control the transmitter 401, 411 and receiver 402, 412. The communications device acting as the relay device 801 further comprises a single transmit and receive buffer 805.

The receiver 803 of the communications device acting as the relay device 801 is configured in combination with the controller 804 of the communications device acting as the relay device 801 to receive signals representing protocol data units 841-846 formed from one or more service data units 840 via a first wireless access interface 831 from the infrastructure equipment 101 according to a first automatic repeat request protocol for transmission to the receiving communications device 104. The receive buffer 805 of the communications device acting as the relay device 801 is configured in combination with the controller 804 of the communications device acting as the relay device 801 to store 851-856 the protocol data units received 841-846 by the receiver 803 from the infrastructure equipment 101 according to the first automatic repeat request protocol. The buffer 805 comprises a sliding window 850, wherein the stored protocol data units 851-856 are cleared from the buffer whenever the buffer is advanced, such that once later space 857 in the buffer 805 has been filled, stored protocol data units 851-856 have been cleared from the buffer in order to make space for the reception of future protocol data units. The transmitter 802 of the communications device acting as the relay device 801 is configured in combination with the controller 804 of the communications device acting as the relay device 801 to transmit signals 861-866 representing the received protocol data units 841-846 from the buffer 805 via a second wireless access interface 832 to the receiving communications device 104 according to a second automatic repeat request protocol.

In embodiments of the present disclosure, protocol data units are each transmitted from the infrastructure equipment having a sequence number defining their position in a predetermined order, a higher sequence number being transmitted after a lower sequence number. The sliding window of the buffer represents protocol data units which have been transmitted by the infrastructure equipment but not yet successfully acknowledged by the receiving communications device. An upper edge of the sliding window is set to a first value equal to a sequence number to be assigned for a next newly generated protocol data unit at the infrastructure equipment and a lower edge of the sliding window is set to a second value equal to a sequence number of a next protocol data unit for which a successful acknowledgement is to be received from the receiving communications device in the predetermined order. The communications device acting as the relay device is configured to receive from the receiving communications device an indication that one or more of the protocol data units have not been successfully received by the receiving communications device, to retransmit from the buffer the one or more of the protocol data units which have not been successfully received to the receiving communications device, and to advance the sliding window according to the second value, such that memory of the buffer is freed at locations at which are stored each of the protocol data units in the predetermined order which have been successfully received before the one or more protocol data units which have not been successfully received. The second value may then be transmitted by the communications device acting as the relay device to the receiving communications device.

In embodiments of the present disclosure, the communications device acting as the relay device is configured to receive from the infrastructure equipment, after a predetermined number of the protocol data units or bytes have been transmitted by the infrastructure equipment, a status request message (polling bit), to request a status report indicating if any protocol data units have not been received, and to transmit to the infrastructure equipment, in response to the status request message, an indication of the protocol data units transmitted by the infrastructure equipment in the predetermined order which have not been successfully received by the receiver having a sequence number lower than a highest sequence number of the protocol data units which have been successfully received.

Figure 9:
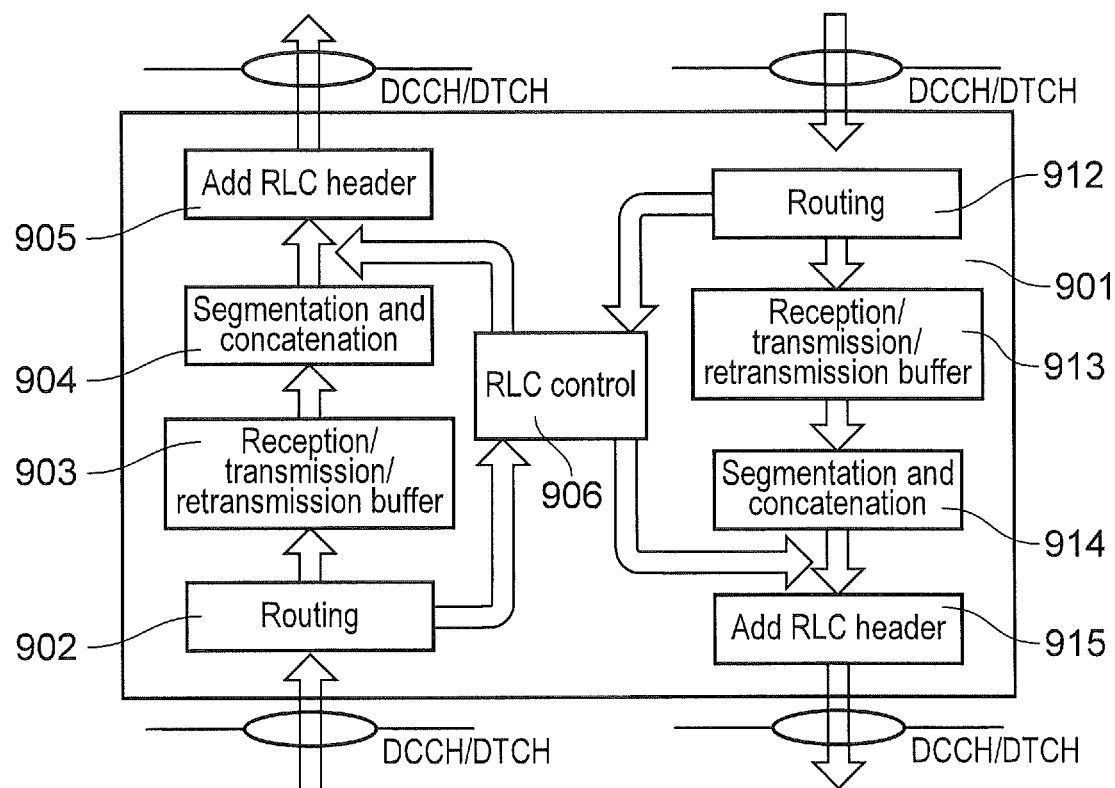
FIG. 9 shows a model of a relay RLC acknowledged mode entity in accordance with embodiments of the present disclosure.

FIG. 9 shows a model of a relay RLC acknowledged mode entity 901 in accordance with embodiments of the present disclosure. The relay RLC AM entity 901 comprises routing means 902, 912, single reception, transmission and retransmission buffers 903, 913, segmentation and concatenation means 904, 914, RLC header addition means 905, 915 and RLC control means 906. The relay RLC AM entity 901 in accordance with embodiments of the present disclosure is similar to the AM RLC model shown in FIG. 6, with the main difference being that there is a single buffer 903 for storing and managing both reception and transmission/retransmission in each direction (e.g. uplink may use the first routing means 902, first single reception, transmission and retransmission buffer 903, first segmentation and concatenation means 904 and first RLC header addition means 905, and downlink may use the second routing means 912, second single reception, transmission and retransmission buffer 913, second segmentation and concatenation means 914 and second RLC header addition means 915). The data is not passed to upper layers via the AM-SAP (acknowledged mode service access point) but is rather directly routed back to a lower layer (to the next radio link, whether this is relay device to remote device or relay device to eNodeB, depending on whether the relay device is operating on the downlink or on the uplink).

The routing function 902, 912 determines whether the received data is a data PDU or a control PDU. Data PDUs are sent directly to the buffer 903, 913 where they are stored. Control PDUs (containing ACK/NACK information sent back from a receiving entity to the relay entity 901 and sent from the relay entity 901 to a transmitting entity) are sent to and from the RLC control function 906—the control function updates the buffer window variables, performs retransmission, etc. based on this control feedback.

The segmentation and concatenation 904, 914 is required in order to re-segment RLC PDUs in case the forward link is not capable of transmitting the complete PDUs as received. The functionality is expected to be identical to the functionality in LTE RLC AM re-segmentation. The RLC header addition function 905, 915 is needed in case of re-segmentation. If the complete PDU as received can be sent in the transport block, then the same header may be used as in the received PDU.

Figure 10:
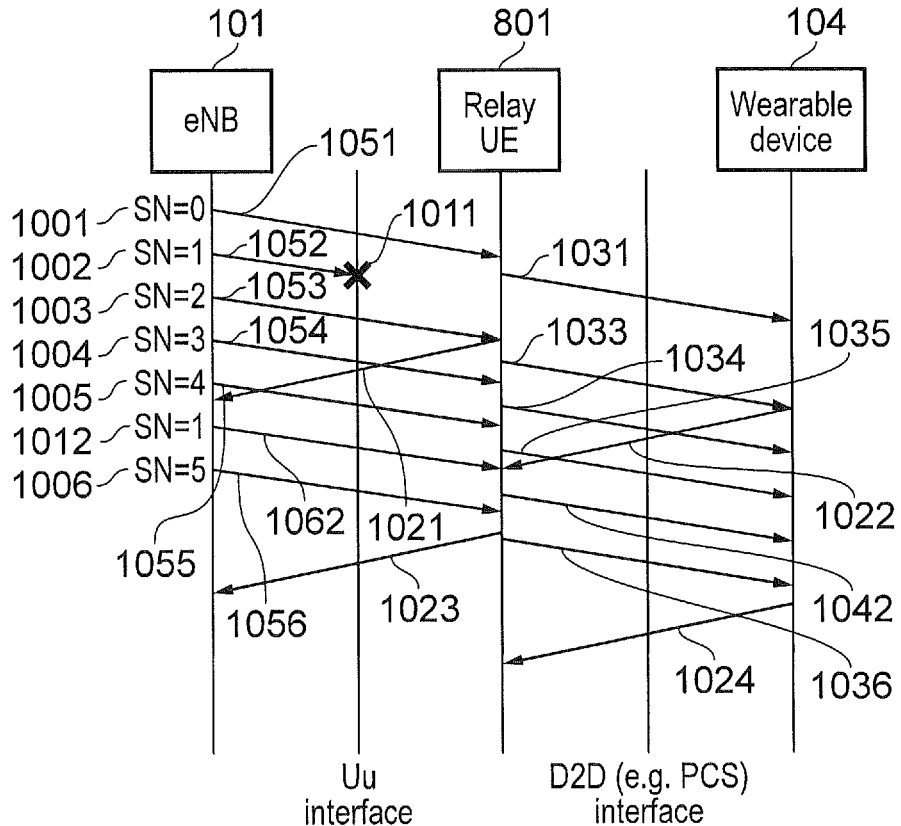
FIG. 10 illustrates an example operation of a single buffer relay ARQ protocol including an eNodeB to relay transmission failure in accordance with embodiments of the present disclosure.

FIG. 10 illustrates an example operation of a single buffer relay ARQ protocol including an eNodeB to relay transmission failure in accordance with embodiments of the present disclosure. FIG. 10 illustrates a message flow diagram including an eNodeB 101, a relay UE 801 and a wearable device (remote or receiving UE) 104. The eNodeB 101 is configured to transmit a plurality of PDUs 1001-1006 with sequence numbers SN of 0 to 5. These PDUs 1001-1006 are configured to be transmitted 1051-1056 by the eNodeB 101 across the Uu interface to the relay UE 801, and forwarded 1031-1036 by the relay UE 801 across a D2D (e.g. the PC5) interface to the wearable device 104. In embodiments of the present disclosure, the link between the relay UE 801 and the wearable device 104 could alternatively be a Bluetooth or Wi-Fi link.

If it is assumed that a single RLC SDU (one ciphered PDCP PDU) is segmented into six RLC PDUs, then it can be seen the transmission delay is reduced, because the relay RLC entity can start forwarding PDUs individually and thus immediately without having to reassemble the SDU (after all six PDUs have been received at the relay) before forwarding.

In the example of FIG. 10, the second PDU 1002 is lost 1011 when transmitting 1052 from the eNodeB 101 to the relay device 801. For simplicity of illustration, the missing PDU detection at the relay UE 801 is configured to send a NACK 1021 when it receives any PDU out of order (in practise this would be configured as a timer, or as several PDUs in order to allow for HARQ retransmissions causing out of sequence PDUs). The eNodeB 101 retransmits the second PDU 1002/1012 as soon as it receives the NACK 1021, and updates its transmission window according to the last successfully transmitted PDU (SN=0) 1001, freeing up one portion of the transmission buffer. Similarly, when the relay UE 801 receives a NACK 1022 for the second PDU 1002 from the wearable device 104, it can update the window to free the space used by the first PDU 1001 because it has now been successfully acknowledged at the remote UE 104.

Upon transmitting the sixth and final PDU 1006 the eNodeB 101 sets a poll bit (last PDU in transmission—however also note the existing PDU and BYTE count polling may be used by the transmitter). The relay RLC entity 801 responds 1023 to indicate that the sixth PDU 1006 has been successfully received.

In addition, one embodiment includes the indication that SN=0 1002 was the last PDU to be transmitted and acknowledged by the remote UE (or alternatively the next SN that needs to be acknowledged) 104—this provides an indication to the eNodeB 101 a buffer occupancy of the relay UE 801 (i.e. relay is still storing SN=1 to 5 1001-1006). When considering an extended example, with constant data transmission from the eNodeB 101, this buffer occupancy at the relay 801 provides an indication of how fast the buffer is being forwarded to the remote device 104—so if a PDU with SN>5 (after the sixth PDU 1006) is transmitted, then once SN=5 1006 has been acknowledged at the relay 801, then this may be reported in the next STATUS PDU to the eNodeB 101 (so the relay 801 can report SN=5 1006 was the last successfully transmitted PDU, while SN=x was the last successfully received). If the buffer starts to fill—the difference between those values will become larger, and the eNodeB 101 can slow down the transmission.

In another embodiment, the relay 801 may report to the eNodeB 101 the maximum transport block size or PDU size that can be transmitted from the relay 801 to the remote device 104. Then, the eNodeB 101 can segment RLC PDUs according to the size that can be transmitted on the D2D link. An alternative (or in addition) the relay UE 801 can re-segment received PDUs into PDU segments (see [4]) in order to fit those into the D2D link transport blocks. The above described mechanism for reporting buffer occupancy will help to avoid the buffer at the relay filling too much and causing protocol stalling.

In the above example, it is assumed that the poll bit in the RLC PDU sent from the eNodeB 101 is also set in the corresponding PDU sent to the relay UE 801. However, it is also possible for separate polling mechanisms (i.e. eNodeB 101 and relay 801 both maintain a PDU count and BYTE count, and set the poll bit according to the current LTE specification).

It is also possible for the poll bit to be forwarded to remote UE 104, and AN/NACK 1024 sent all the way back to the eNodeB 101—however this implementation increases overall round trip time—it means that the polling needs to be done more frequently in order to avoid buffers filling up (because more new data will be sent in the time it takes to receive ACK/NACK in response to the polling bit). It also does not take into account the quality of each link individually, but rather the overall two-stage radio link. Although not the most efficient polling mechanism, this embodiment could be a polling mechanism to use along with single buffer forwarding.

In the above example, a problem may occur when the RLC PDU has been successfully received at the relay RLC, and acknowledged, but then the transmission from relay to remote device fails. In this case the original transmitting entity would have advanced the window, and possibly indicated a successfully transmitted SDU to upper layer (e.g. TCP/IP). In this embodiment, when the relay transmitting function reaches maximum retransmissions (which mean transmission ultimately fails) then this causes the status of this PDU at the receiving function to be considered unsuccessful. This in turn causes a NACK to be sent to the original transmitter, which would consider the transmission ultimately failed. However there is no opportunity to retransmit the failed transmission because the window has been advanced. It can be either accepted that occasionally there will be a leftover error from RLC AM (so TCP/upper layer error detection kicks in) or the robustness of the RLC mechanism can be improved. To address this, a more reliable D2D link may be designed (e.g. more robust HARQ, higher number of retransmissions etc.). However, another embodiment involves the synchronisation of the original transmitting RLC window operation, polling and acknowledgement operation of the original transmitter and the relay transmitter part (still using the single buffer at the relay). An example of this is shown in FIG. 11.

Figure 11:
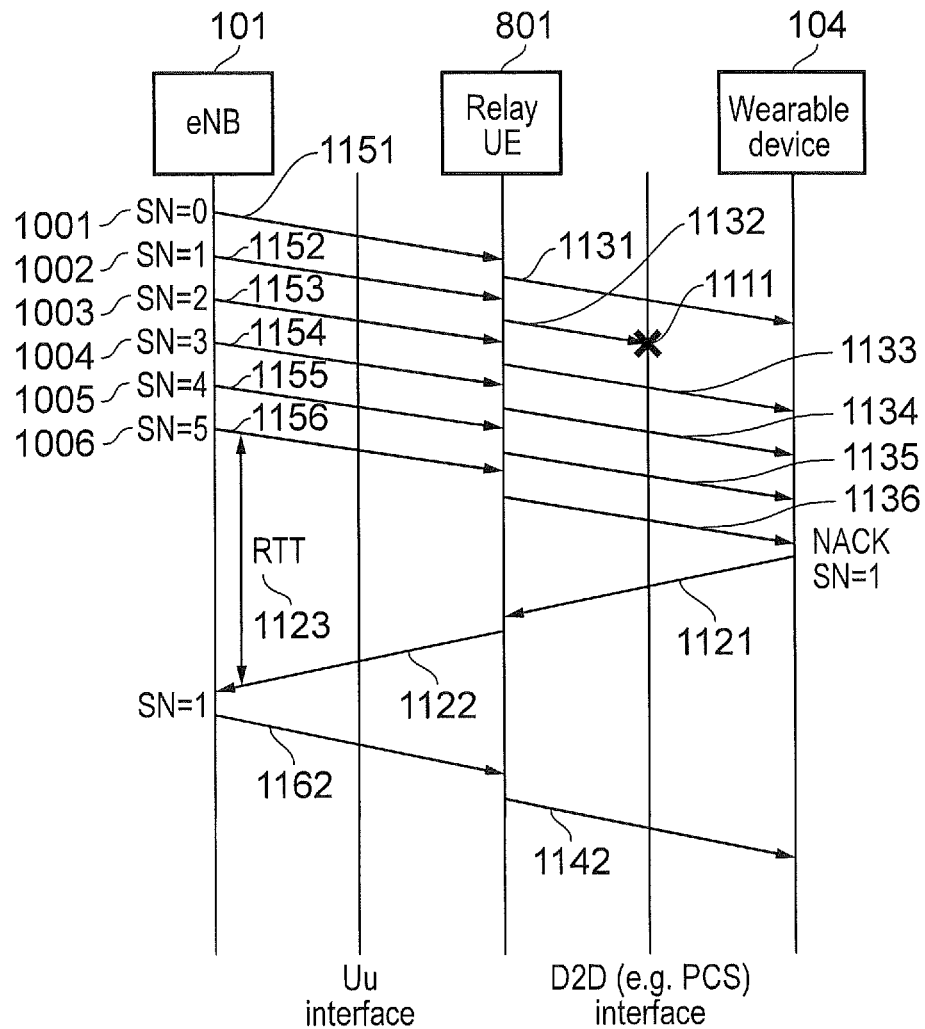
FIG. 11 illustrates an example operation of a single buffer relay ARQ protocol including a relay to remote device transmission failure in accordance with embodiments of the present disclosure.

FIG. 11 illustrates an example operation of a single buffer relay ARQ protocol including a relay to remote device transmission failure in accordance with embodiments of the present disclosure. FIG. 11 illustrates a message flow diagram including an eNodeB 101, a relay UE 801 and a wearable device (remote or receiving UE) 104. The eNodeB 101 is configured to transmit a plurality of PDUs 1101-1106 with sequence numbers SN of 0 to 5. These PDUs 1101-1106 are configured to be transmitted 1151-1156 by the eNodeB 101 across the Uu interface to the relay UE 801, and forwarded 1131 to 1136 by the relay UE 801 across a D2D (e.g. the PC5) interface to the wearable device 104.

In the example of FIG. 11, the second PDU 1102 is lost 1111 when transmitting 1132 from the relay device 801 to the wearable device 104. The missing PDU detection at the wearable device 104 is configured to send a NACK 1121 indicating that it has not received the second PDU 1102. The relay device 801 forwards this NACK 1122 to the eNodeB 101, which is able to retransmit 1162 the missing PDU 1101 to the relay device 801, from where it is forwarded 1142 to the wearable device 1104, where this time it is received successfully.

In the example of FIG. 11, all six PDUs 1101-1106 are transmitted from the eNodeB 101 to the relay 801 and the poll bit is set on the last PDU 1106. Should the relay 801 acknowledge all six PDUs 1101-1106 at this point, then the eNodeB 101 would advance its window and hence stop storing all six of the PDUs 1101-1106. However, the PDU with SN=1 1102 is lost at the relay device 801 to wearable device 104 link. Under the majority of circumstances, this PDU 1102 can be recovered using retransmissions from the relay UE 801. In some circumstances however this may not be possible, so to address this the eNodeB 101 should store all transmitted PDUs 1101-1106 until the ACK is received from the remote device 801 (via relay). Once the acknowledgement is finally received at the original transmitter (the eNodeB 101), it is known that delivery has been successful across both radio links and so the window may advance. The advantage of this approach is reliability. However, it does come at the cost of an increased buffer requirement at the original transmitter. The RTT 1123 (round trip time—the time it takes from transmitting a PDU to receiving the ACK) is the sum of delays across both the Uu radio link and the PC5/sidelink.

The buffer requirement at the transmitter side is calculated by taking the maximum theoretical throughput and multiplying it by the RTT (because PDUs need to be stored until the ACK is received). For example:

RLC buffer size=(Maximum theoretical throughput (unit=byte/sec))×RTT (unit=sec)

Maximum theoretical throughput="Maximum number of DL-SCH transport block bits received within a TTI" ($1^{st}$ column)/8 (bit to byte conversion)×1000 (as eNB sends DL data at every 1 ms).

3GPP specification TS 36.306 [5] uses RTT=75 ms for the layer 2 buffer size calculation. For example, cat 9 requires RLC buffer size=(452256/8)×1000×0.075=4.2399 Mbytes. Note that Table 4.1-3 in [5] shows a slightly bigger layer 2 buffer size for cat 9 because of ASN.1 definition granularity.

The implication of this transmitter window scheme is that the transmitting side (eNodeB in the example of FIG. 11) has an increased buffer requirement due to the longer total RTT. The implication on the relay RLC itself does not change—the acknowledgement state variable VT(A) is still reported from relay to sender to indicate the buffer status (it indicates the last successfully delivered PDU to the remote device). The difference is how the sender (eNodeB) uses that information—in this case it is used not only for flow control but also for updating the transmission window and buffer management.

The same principles apply when transmitting from a remote UE via a relay to an eNB—the example of FIGS. 8, 10 and 11 just shows eNodeB→relay→remote UE operation. In addition, the single buffer principle can apply to both UM (unacknowledged mode) and TM (transparent mode) relay as well as AM (acknowledged mode) relay—the operation will work without any polling or acknowledgements. For TM, embodiments of the present disclosure don't add much value, but for UM they allow forwarding with a single buffer without waiting for reassembly of SDUs.

Figure 12:
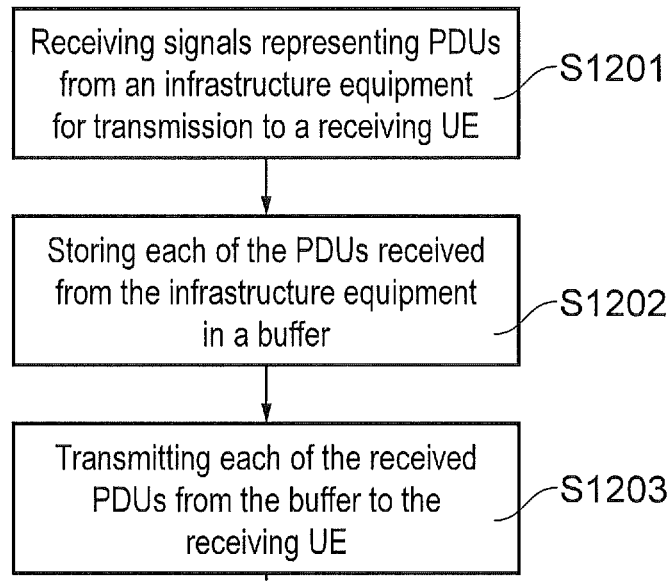
FIG. 12 shows a flow diagram illustrating a process of communications between a single buffer relay device, a remote UE, and an eNodeB and a relay node in accordance with embodiments of the present disclosure.

FIG. 12 shows a flow diagram illustrating a method of communications between a single buffer relay device, a remote UE, and an eNodeB and a relay node in accordance with embodiments of the present disclosure. The method comprises, in step S1201, receiving signals representing protocol data units formed from one or more service data units via a first wireless access interface from the infrastructure equipment according to a first automatic repeat request protocol for transmission to the receiving communications device. The method then comprises, in step S1202, storing in a buffer the protocol data units received from the infrastructure equipment according to the first automatic repeat request protocol. The method further comprises, in step S1203, transmitting according to a second automatic repeat request protocol the protocol data units received from the infrastructure equipment from the buffer to the receiving communications device via a second wireless access interface.

Figures 13A, 13B:
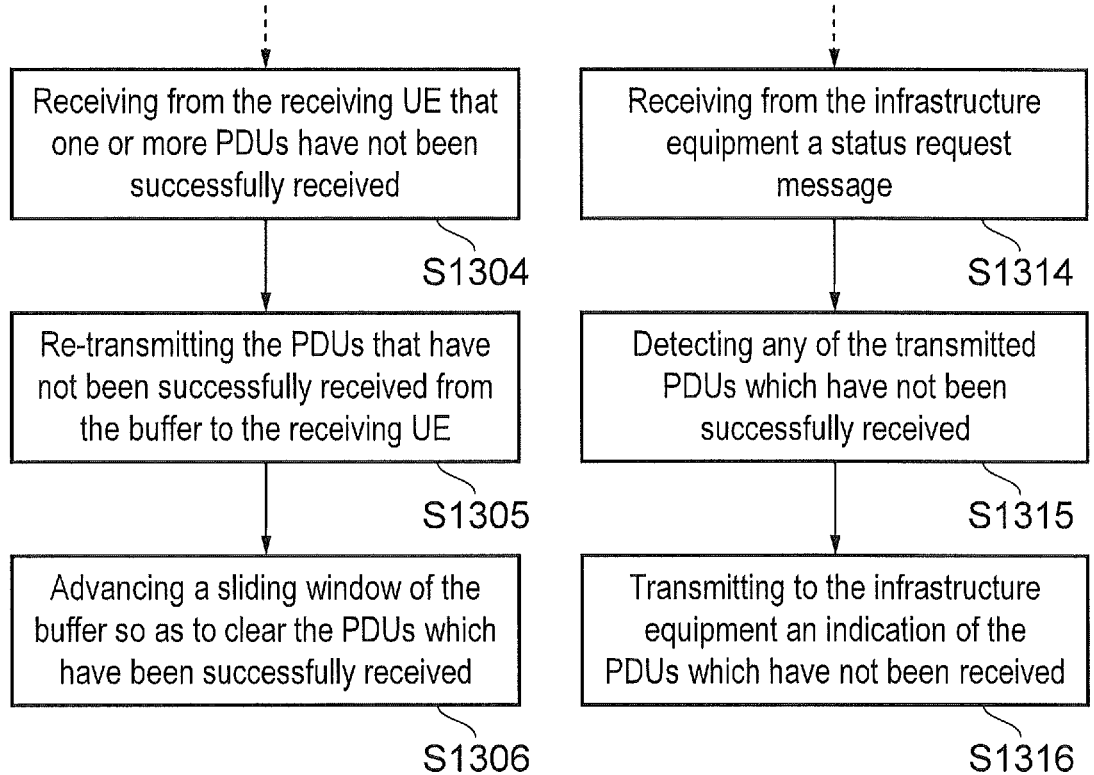
FIG. 13A shows a flow diagram illustrating a process of further communications between a single buffer relay device, a remote UE, and an eNodeB and a relay node including a relay to remote UE transmission failure in accordance with embodiments of the present disclosure.
FIG. 13B shows a flow diagram illustrating a process of further communications between a single buffer relay device, a remote UE, and an eNodeB and a relay node including an eNodeB to relay transmission failure in accordance with embodiments of the present disclosure.

FIG. 13A shows a flow diagram illustrating a method of further communications between a single buffer relay device, a remote UE, and an eNodeB and a relay node including a relay to remote UE transmission failure in accordance with embodiments of the present disclosure. The method follows on from step S1203 of the flow diagram shown in FIG. 12 and comprises, in step S1304, receiving from the receiving UE that one or more PDUs have not been successfully received. The method then comprises, in step S1305, re-transmitting the PDUs that have not been successfully received from the buffer to the receiving UE. The method further comprises, in step S1306, advancing a sliding window of the buffer so as to clear the PDUs which have been successfully received.

FIG. 13B shows a flow diagram illustrating a method of further communications between a single buffer relay device, a remote UE, and an eNodeB and a relay node including an eNodeB to relay transmission failure in accordance with embodiments of the present disclosure. Similarly to the process described in the flow diagram of FIG. 13A, the method of FIG. 13B also follows on from step S1203 of the flow diagram shown in FIG. 12 and comprises, in step S1314, receiving from the infrastructure equipment a status request message. The method then comprises, in step S1315, detecting if any of the PDUs transmitted by the infrastructure equipment have not been successfully received. The method further comprises, in step S1315, transmitting to the infrastructure equipment an indication of the PDUs which have not been successfully received.

Although the above described embodiments of the present technique deal primarily with the relaying of downlink transmissions from an infrastructure equipment to a remote device, it should be clear to those reading the present disclosure that embodiments of the present technique may also include the relaying of signals on the uplink received by the relay device from a transmitting remote communications device and relayed to the infrastructure equipment, or the D2D relaying of signals between two communications devices.

Advantages of embodiments of the present technique include that they allow for a reduction of layer 2 buffer space requirement, as a single buffer is used for each relay RLC—there is therefore no need to reserve space for transmission and reception buffers separately. Advantages of embodiments of the present technique also include that they allow for delay reduction, since the relay entity does not need to wait for complete SDUs before the data can be forwarded, and so the amount of delay introduced by the relay is minimised or at least reduced. Further to this, since the relay does not need to reconstruct RLC SDUs or copy data from receive to transmit buffers, processing load is reduced which directly impacts power consumption. Some embodiments of the present disclosure allow for the original transmitter to take into account the relay buffer occupancy, to account for a potentially slower radio link between relay and remote device. The relay RLC is able to convey information about the forward link to the original RLC transmitting entity. This also prevents protocol stalling (stalling is the term used for when no more data can be transmitted due to a full buffer) due to relay buffer problems, which would be invisible to the original transmitter. In current systems and architectures, only stalling at the transmission buffer is visible. Finally, embodiments of the present disclosure allow for the simplification of communication systems and architectures, as a single RLC entity handles both the receive and transmit operation (two radio links) at the relay UE.

The following numbered paragraphs provide further example aspects and features of the present technique:

Paragraph 1. A communications device acting as a relay device configured to communicate with an infrastructure equipment of a mobile communications network and a receiving communications device operating with the mobile communications network, the communications device acting as the relay device comprising
a receiver configured to receive signals representing protocol data units formed from one or more service data units via a first wireless access interface from the infrastructure equipment according to a first automatic repeat request process for transmission to the receiving communications device,
a transmitter configured to transmit signals representing the received protocol data units via a second wireless access interface to the receiving communications device according to a second automatic repeat request process,
a controller configured to control the transmitter to transmit the signals and to control the receiver to receive the signals to transmit, and
a buffer configured to store the protocol data units received by the receiver from the infrastructure equipment according to the first automatic repeat request process, wherein the controller is configured in combination with the transmitter, the receiver and the buffer
to transmit according to the second automatic repeat request process the protocol data units received from the infrastructure equipment from the buffer to the receiving communications device.

Paragraph 2. A communications device acting as a relay device according to Paragraph 1,
wherein the protocol data units are each transmitted from the infrastructure equipment having a sequence number defining their position in a predetermined order, a higher sequence number being transmitted after a lower sequence number,
wherein the buffer comprises a sliding window which represents protocol data units which have been transmitted by the infrastructure equipment but not yet successfully acknowledged by the receiving communications device, an upper edge of the sliding window being set to a first value equal to a sequence number to be assigned for a next newly generated protocol data unit at the infrastructure equipment and a lower edge of the sliding window being set to a second value equal to a sequence number of a next protocol data unit for which a successful acknowledgement is to be received from the receiving communications device in the predetermined order, and the controller is configured in combination with the transmitter, the receiver and the buffer
to receive from the receiving communications device an indication that one or more of the protocol data units have not been successfully received by the receiving communications device,
to retransmit from the buffer the one or more of the protocol data units which have not been successfully received to the receiving communications device, and
to advance the sliding window according to the second value, such that memory of the buffer is freed at locations at which are stored each of the protocol data units in the predetermined order which have been successfully received before the one or more protocol data units which have not been successfully received.

Paragraph 3. A communications device acting as a relay device according to Paragraph 3, wherein the controller is configured to combination with the transmitter to transmit the second value to the infrastructure equipment.

Paragraph 4. A communications device acting as a relay device according to any of Paragraphs 1 to 3, wherein the controller is configured in combination with the transmitter to transmit to the infrastructure equipment an indication of a maximum protocol data unit size that can be transmitted from the communications device acting as the relay device to the receiving communications device.

Paragraph 5. A communications device acting as a relay device according to any of Paragraphs 1 to 4, wherein the controller is configured in combination with the buffer
to determine from the received indication that all of the protocol data units have been successfully received by the receiving communications device, and subsequently
to clear from the buffer each of the protocol data units.

Paragraph 6. A communications device acting as a relay device according to Paragraph 1 wherein the protocol data units are transmitted from the infrastructure equipment in a predetermined order and the controller is configured in combination with the transmitted, the receiver and the buffer
to receive from the infrastructure equipment, after a predetermined number of the protocol data units have been transmitted by the infrastructure equipment, a status request message,
to detect if one or more protocol data units transmitted by the infrastructure equipment have not been received by the receiver, and
to transmit to the infrastructure equipment, in response to the status request message, an indication of the protocol data units transmitted by the infrastructure equipment in the predetermined order which have not been successfully received by the receiver having a sequence number lower than a highest sequence number of protocol data units which have been successfully received.

Paragraph 7. A communications device acting as a relay device according to Paragraph 6, comprising a timer wherein the detection that the protocol data units which have not been received is configured as a time determined by the timer after receiving a previous one of the protocol data units.

Paragraph 8. A communications device acting as a relay device according to Paragraph 6 or Paragraph 7, wherein the controller is configured in combination with the receiver to receive from the infrastructure equipment a re-transmission of the one or more protocol data units transmitted by the infrastructure equipment which have not been successfully received, before a next protocol data unit in the predetermined order is received from the infrastructure equipment.

Paragraph 9. A communications device acting as a relay device according to any of Paragraphs 1 to 8, wherein the received protocol data units are re-segmented and subsequently transmitted from the buffer to the receiving communications device as second protocol data units according to the second automatic repeat request protocol which are different to the received protocol data units according to the first automatic repeat request protocol.

Paragraph 10. A communications device acting as a relay device configured to communicate with an infrastructure equipment of a mobile communications network and a transmitting communications device operating with the mobile communications network, the communications device acting as the relay device comprising a receiver configured to receive signals representing protocol data units formed from one or more service data units via a second wireless access interface from the transmitting communications device according to a second automatic repeat request protocol for transmission to the infrastructure equipment, a transmitter configured to transmit signals representing the received protocol data units via a first wireless access interface to the infrastructure equipment according to a first automatic repeat request protocol, a controller configured to control the transmitter to transmit the signals and to control the receiver to receive the signals to transmit, and a buffer configured to store the protocol data units received by the receiver from the transmitting communications device according to the second automatic repeat request protocol, wherein the controller is configured in combination with the transmitter, the receiver and the buffer to transmit according to the first automatic repeat request protocol the protocol data units received from the transmitting communications device from the buffer to the infrastructure equipment.

Paragraph 11. A communications device acting as a relay device according to Paragraph 10, wherein the protocol data units are each transmitted from the transmitting communications device having a sequence number defining their position in a predetermined order, a higher sequence number being transmitted after a lower sequence number, wherein the buffer comprises a sliding window which represents protocol data units which have been transmitted by the transmitting communications device but not yet successfully acknowledged by the infrastructure equipment, an upper edge of the sliding window being set to a first value equal to a sequence number to be assigned for a next newly generated protocol data unit at the transmitting communications device and a lower edge of the sliding window being set to a second value equal to a sequence number of a next protocol data unit for which a successful acknowledgement is to be received from the infrastructure equipment in the predetermined order, and the controller is configured in combination with the transmitter, the receiver and the buffer to receive from the infrastructure equipment an indication that one or more of the protocol data units have not been successfully received by the infrastructure equipment, to retransmit from the buffer the one or more of the protocol data units which have not been successfully received to the infrastructure equipment, and to advance the sliding window according to the second value, such that memory of the buffer is freed at locations at which are stored each of the protocol data units in the predetermined order which have been successfully received before the one or more protocol data units which have not been successfully received.

Paragraph 12. A communications device acting as a relay device according to Paragraph 11, wherein the controller is configured to combination with the transmitter to transmit the second value to the transmitting communications device.

Paragraph 13. A communications device acting as a relay device according to any of Paragraphs 10 to 12, wherein the controller is configured in combination with the transmitter to transmit to the transmitting communications device an indication of a maximum protocol data unit size that can be transmitted from the communications device acting as the relay device to the infrastructure equipment.

Paragraph 14. A communications device acting as a relay device according to any of Paragraphs 10 to 13, wherein the controller is configured in combination with the buffer to determine from the received indication that all of the protocol data units have been successfully received by the infrastructure equipment, and subsequently to clear from the buffer each of the protocol data units.

Paragraph 15. A communications device acting as a relay device according to Paragraph 10 wherein the protocol data units are transmitted from the transmitting communications device in a predetermined order and the controller is configured in combination with the transmitted, the receiver and the buffer to receive from the transmitting communications device, after a predetermined number of the protocol data units have been transmitted by the transmitting communications device, a status request message, to detect if one or more protocol data units transmitted by the transmitting communications device have not been received by the receiver, and to transmit to the transmitting communications device, in response to the status request message, an indication of the protocol data units transmitted by the transmitting communications device in the predetermined order which have not been successfully received by the receiver having a sequence number lower than a highest sequence number of protocol data units which have been successfully received.

Paragraph 16. A communications device acting as a relay device according to Paragraph 15, comprising a timer wherein the detection that the protocol data units which have not been received is configured as a time determined by the timer after receiving a previous one of the protocol data units.

Paragraph 17. A communications device acting as a relay device according to Paragraph 15 or Paragraph 16, wherein the controller is configured in combination with the receiver to receive from the transmitting communications device a re-transmission of the one or more protocol data units transmitted by the transmitting communications device which have not been successfully received, before a next protocol data unit in the predetermined order is received from the transmitting communications device.

Paragraph 18. A communications device acting as a relay device according to any of Paragraphs 10 to 17, wherein the received protocol data units are re-segmented and subsequently transmitted from the buffer to the infrastructure equipment as second protocol data units according to the first automatic repeat request protocol which are different to the received protocol data units according to the second automatic repeat request protocol.

Paragraph 19. A communications device acting as a relay device configured to communicate with a transmitting communications device operating with a mobile communications network and a receiving communications device operating with the mobile communications network, the communications device acting as the relay device comprising
- a receiver configured to receive signals representing protocol data units formed from one or more service data units via a first wireless access interface from the transmitting communications device according to a first automatic repeat request protocol for transmission to the receiving communications device,
- a transmitter configured to transmit signals representing the received protocol data units via a second wireless access interface to the receiving communications device according to a second automatic repeat request protocol,
- a controller configured to control the transmitter to transmit the signals and to control the receiver to receive the signals to transmit, and
- a buffer configured to store the protocol data units received by the receiver from the transmitting communications device according to the first automatic repeat request protocol, wherein the controller is configured in combination with the transmitter, the receiver and the buffer
- to transmit according to the second automatic repeat request protocol the protocol data units received from the transmitting communications device from the buffer to the receiving communications device.

Paragraph 20. A communications device acting as a relay device according to Paragraph 19, wherein the protocol data units are each transmitted from the transmitting communications device having a sequence number defining their position in a predetermined order, a higher sequence number being transmitted after a lower sequence number,
- wherein the buffer comprises a sliding window which represents protocol data units which have been transmitted by transmitting communications device but not yet successfully acknowledged by the receiving communications device, an upper edge of the sliding window being set to a first value equal to a sequence number to be assigned for a next newly generated protocol data unit at the transmitting communications device and a lower edge of the sliding window being set to a second value equal to a sequence number of a next protocol data unit for which a successful acknowledgement is to be received from the receiving communications device in the predetermined order, and the controller is configured in combination with the transmitter, the receiver and the buffer
- to receive from the receiving communications device an indication that one or more of the protocol data units have not been successfully received by the receiving communications device,
- to retransmit from the buffer the one or more of the protocol data units which have not been successfully received to the receiving communications device, and
- to advance the sliding window according to the second value, such that memory of the buffer is freed at locations at which are stored each of the protocol data units in the predetermined order which have been successfully received before the one or more protocol data units which have not been successfully received.

Paragraph 21. A communications device acting as a relay device according to Paragraph 20, wherein the controller is configured to combination with the transmitter to transmit the second value to the transmitting communications device.

Paragraph 22. A communications device acting as a relay device according to any of Paragraphs 19 to 21, wherein the controller is configured in combination with the transmitter to transmit to the transmitting communications device an indication of a maximum protocol data unit size that can be transmitted from the communications device acting as the relay device to the receiving communications device.

Paragraph 23. A communications device acting as a relay device according to any of Paragraphs 19 to 22, wherein the controller is configured in combination with the buffer
- to determine from the received indication that all of the protocol data units have been successfully received by the receiving communications device, and subsequently
- to clear from the buffer each of the protocol data units.

Paragraph 24. A communications device acting as a relay device according to Paragraph 19 wherein the protocol data units are transmitted from the transmitting communications device in a predetermined order and the controller is configured in combination with the transmitted, the receiver and the buffer
- to receive from the transmitting communications device, after a predetermined number of the protocol data units have been transmitted by the transmitting communications device, a status request message,
- to detect if one or more protocol data units transmitted by the transmitting communications device have not been received by the receiver, and
- to transmit to the transmitting communications device, in response to the status request message, an indication of the protocol data units transmitted by the transmitting communications device in the predetermined order which have not been successfully received by the receiver having a sequence number lower than a highest sequence number of the protocol data units which have been successfully received.

Paragraph 25. A communications device acting as a relay device according to Paragraph 24, comprising a timer wherein the detection that the protocol data units which have not been received is configured as a time determined by the timer after receiving a previous one of the protocol data units.

Paragraph 26. A communications device acting as a relay device according to Paragraph 24 or Paragraph 25, wherein the controller is configured in combination with the receiver to receive from the transmitting communications device a re-transmission of the one or more protocol data units transmitted by the transmitting communications device which have not been successfully received, before a next protocol data unit in the predetermined order is received from the transmitting communications device.

Paragraph 27. A communications device acting as a relay device according to any of Paragraphs 19 to 26, wherein the received protocol data units are re-segmented and subsequently transmitted from the buffer to the receiving communications device as second protocol data units according to the second automatic repeat request protocol which are different to the received protocol data units according to the first automatic repeat request protocol.

Paragraph 28. A method of operating a communications device acting as a relay device configured to communicate with an infrastructure equipment of a mobile communications network and a receiving communications device operating with the mobile communications network, the method comprising receiving signals representing protocol data units formed from one or more service data units via a first wireless access interface from the infrastructure equipment according to a first automatic repeat request protocol for transmission to the receiving communications device, storing in a buffer the protocol data units received from the infrastructure equipment according to the first automatic repeat request protocol, and transmitting according to a second automatic repeat request protocol the protocol data units received from the infrastructure equipment from the buffer to the receiving communications device via a second wireless access interface.

Paragraph 29. A method of operating a communications device acting as a relay device configured to communicate with an infrastructure equipment of a mobile communications network and a transmitting communications device operating with the mobile communications network, the method comprising receiving signals representing protocol data units formed from one or more service data units via a second wireless access interface from the transmitting communications device according to a second automatic repeat request protocol for transmission to the infrastructure equipment, storing in a buffer the protocol data units received from the transmitting communications device according to the second automatic repeat request protocol, and transmitting according to a first automatic repeat request protocol the protocol data units received from the transmitting communications device from the buffer to the infrastructure equipment via a first wireless access interface.

Paragraph 30. A method of operating a communications device acting as a relay device configured to communicate with a transmitting communications device operating with a mobile communications network and a receiving communications device operating with the mobile communications network, the method comprising receiving signals representing protocol data units formed from one or more service data units via a first wireless access interface from the transmitting communications device according to a first automatic repeat request protocol for transmission to the receiving communications device, storing in a buffer the protocol data units received from the transmitting communications device according to the first automatic repeat request protocol, and transmitting according to a second automatic repeat request protocol the protocol data units received from the transmitting communications device from the buffer to the receiving communications device via a second wireless access interface.

Paragraph 31. Circuitry for a communications device acting as a relay device configured to communicate with an infrastructure equipment of a mobile communications network and a receiving communications device operating with the mobile communications network, the communications device acting as the relay device comprising a receiver configured to receive signals representing protocol data units formed from one or more service data units via a first wireless access interface from the infrastructure equipment according to a first automatic repeat request protocol for transmission to the receiving communications device, a transmitter configured to transmit signals representing the received protocol data units via a second wireless access interface to the receiving communications device according to a second automatic repeat request protocol, a controller configured to control the transmitter to transmit the signals and to control the receiver to receive the signals to transmit, and a buffer configured to store the protocol data units received by the receiver from the infrastructure equipment according to the first automatic repeat request protocol, wherein the controller is configured in combination with the transmitter, the receiver and the buffer to transmit according to the second automatic repeat request protocol the protocol data units received from the infrastructure equipment from the buffer to the receiving communications device.

Paragraph 32. Circuitry for a communications device acting as a relay device configured to communicate with an infrastructure equipment of a mobile communications network and a transmitting communications device operating with the mobile communications network, the communications device acting as the relay device comprising a receiver configured to receive signals representing protocol data units formed from one or more service data units via a second wireless access interface from the transmitting communications device according to a second automatic repeat request protocol for transmission to the infrastructure equipment, a transmitter configured to transmit signals representing the received protocol data units via a first wireless access interface to the infrastructure equipment according to a first automatic repeat request protocol, a controller configured to control the transmitter to transmit the signals and to control the receiver to receive the signals to transmit, and a buffer configured to store the protocol data units received by the receiver from the transmitting communications device according to the second automatic repeat request protocol, wherein the controller is configured in combination with the transmitter, the receiver and the buffer to transmit according to the first automatic repeat request protocol the protocol data units received from the transmitting communications device from the buffer to the infrastructure equipment.

Paragraph 33. Circuitry for a communications device acting as a relay device configured to communicate with a transmitting communications device operating with a mobile communications network and a receiving communications device operating with the mobile communications network, the communications device acting as the relay device comprising a receiver configured to receive signals representing protocol data units formed from one or more service data units via a first wireless access interface from the transmitting communications device according to a first automatic repeat request protocol for transmission to the receiving communications device, a transmitter configured to transmit signals representing the received protocol data units via a second wireless access interface to the receiving communications device according to a second automatic repeat request protocol, a controller configured to control the transmitter to transmit the signals and to control the receiver to receive the signals to transmit, and a buffer configured to store the protocol data units received by the receiver from the transmitting communications device according to the first automatic repeat request protocol, wherein the controller is configured in combination with the transmitter, the receiver and the buffer to transmit according to the second automatic repeat request protocol the protocol data units received from the transmitting communications device from the buffer to the receiving communications device.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-160677, "Further Enhancements to LTE Device to Device, UE to Network Relays for IoT and Wearables," Qualcomm et al, RAN #71.
[4] TS 36.322, "Evolved Universal Terrestrial Radio Access (E-UTRA); Radio Link Control (RLC) protocol specification," 3GPP.
[5] TS 36.306, "Evolved Universal Terrestrial Radio Access (E-UTRA); User Equipment (UE) radio access capabilities," 3GPP.

What is claimed is:

1. A communications device acting as a relay device configured to communicate with an infrastructure equipment of a mobile communications network and a receiving communications device operating with the mobile communications network, the communications device acting as the relay device comprising:
   a receiver configured to receive signals representing protocol data units formed from our or more service data units via a first wireless access interface from the infrastructure equipment according to a first automatic repeat request process for transmission to the receiving communications device,
   a transmitter configured to transmit signals representing the received protocol data units via a second wireless access interface to the receiving communications device according to a second automatic repeat request process,
   a controller configured to control the transmitter to transmit the signals and to control the receiver to receive the signals to transmit, and
   a buffer configured to store the protocol data units received by the receiver from the infrastructure equipment according to the first automatic repeat, request process, wherein
   the controller is configured in combination with the transmitter, the receiver and the buffer to transmit according to the second automatic repeat request process the protocol data Units received from the infrastructure equipment from the buffer to the receiving communications device.

2. A communications device acting as a relay device as claimed in claim 1,
   wherein the protocol data units are each transmitted from the infrastructure equipment having a sequence number defining their position in a predetermined order, a higher sequence number being transmitted after a lower sequence number,
   wherein the buffer comprises a sliding window which represents protocol data units which have been transmitted by the infrastructure equipment but not yet successfully acknowledged by the receiving communications device, an upper edge of the sliding window being set to a first value equal to a sequence number to be assigned for a next newly generated protocol data unit at the infrastructure equipment and a lower edge of the sliding window being set to a second value equal to a sequence number of a next protocol data unit for which a successful acknowledgement is to be received from the receiving communications device in the predetermined order, and the controller is configured M combination with the transmitter, the receiver and the buffer
   to receive from the receiving communications device an indication that one or more of the protocol data units have not been successfully received by the receiving communications device, to retransmit from the buffer the one or more of the protocol data units which have not been successfully received to the receiving communications device, and to advance the sliding window according to the second value, such that memory of the buffer is reed at locations at which are stored each of the protocol data units in the predetermined order which have been successfully received before the one or more protocol data units which have not been successfully received.

3. A communications device acting as a relay device as claimed in claim 2, wherein the controller is configured to combination with the transmitter to transmit the second value to the infrastructure equipment.

4. A communications device acting as a relay device as claimed in claim 1, wherein the controller is configured in combination with the transmitter to transmit to the infrastructure equipment an indication of a maximum protocol data unit size that can be transmitted from the communications device acting as the relay device to the receiving communications device.

5. A communications device acting as a relay device as claimed in claim 1, wherein the controller is configured in combination with the buffer to determine from the received indication that all of the protocol data units have been successfully received by the receiving communications device, and subsequently to clear from the buffer each of the protocol data units.

6. A communications device acting as a relay device as claimed in claim 1, wherein the protocol data units are transmitted from the infrastructure equipment in a predetermined order and the controller is configured in combination with the transmitted, the receiver and the buffer to receive from the infrastructure equipment, after a predetermined number of the protocol data units have been transmitted by the infrastructure equipment, a status request message, to detect if one or more protocol data units transmitted by the infrastructure equipment have not been received by the receiver, and to transmit to the infrastructure equipment, in response to the status request message, an indication of the protocol data units transmitted by the infrastructure equipment in the predetermined order which have not been successfully received by the receiver having a sequence number lower than a highest sequence number of protocol data units which have been successfully received.

7. A communications device acting as a relay device as claimed in claim 6, comprising a tuner wherein the detection that the protocol data units which have not been received is configured as a time determined by the timer after receiving a previous one of the protocol data units.

8. A communications device acting as a relay device as claimed in claim 6, wherein the controller is configured in combination with the receiver to receive from the infrastructure equipment a re-transmission of the one car more protocol data units transmitted by the infrastructure equipment which have not been successfully received, before a next protocol data unit in the predetermined order is received from the infrastructure equipment.

9. A communications device acting as a relay device as claimed in claim 1, wherein the received protocol data units are re-segmented and subsequently transmitted from the buffer to the receiving communications device as second protocol data units according to the second automatic repeat request protocol which are different to the received protocol data units according to the first automatic repeat request protocol.

10. A communications device acting as a relay device configured to communicate with an infrastructure equipment of a mobile communications network and a transmitting communications device operating with the mobile communications network, the communications device acting as the relay device comprising:

a receiver configured to receive signals representing protocol data units formed from one or more service data units via a second wireless access interface from the transmitting communications device according to a second automatic repeat request protocol for transmission to the infrastructure equipment, a transmitter configured to transmit signals representing the received protocol data units via a first wireless access interface to the infrastructure equipment according to a first automatic repeat request protocol, a controller configured to control the transmitter to transmit the signals and to control the receiver to receive the signals to transmit, and a buffer configured to store the protocol data units received by the receiver from the transmitting communications device according to the second automatic repeat request protocol, wherein the controller is configured in combination with the transmitter, the receiver and the buffer to transmit according to the first automatic repeat request protocol the protocol data units received from the transmitting communications device from the buffer to the infrastructure equipment.

11. A communications device acting as a relay device as claimed in claim 10, wherein the protocol data units are each transmitted from the transmitting communications device having a sequence number defining their position in a predetermined order, a higher sequence number being transmitted after a lower sequence number, wherein the buffer comprises a sliding window which represents protocol data units which have been transmitted by the transmitting communications device but not yet successfully acknowledged by the infrastructure equipment, an upper edge of the slid g window being set to a first value equal to a sequence number to be assigned for a next newly generated protocol data unit at the transmitting communications device and a lower edge of the sliding window being set to a second value equal to a sequence number of a next protocol data unit for which a successful acknowledgement is to be received from the infrastructure equipment in the predetermined order, and the controller is configured in combination with the transmitter, the receiver and the buffer to receive from the infrastructure equipment an indication that one or more of the protocol data units have not been successfully received by the infrastructure equipment, to retransmit from the buffer the one or more of the protocol data units which have not been successfully received to the infrastructure equipment, and to advance the sliding window according to the second value, such that memory of the buffer is freed at locations at which are stored each of the protocol data units in the predetermined order which have been successfully received before the one or more protocol data units which have not been successfully received.

12. A communications device acting as a relay device as claimed in claim 11, wherein the controller is configured to combination with the transmitter to transmit the second value to the transmitting communications device.

13. A communications device acting as a relay device as claimed in claim 10, wherein the controller is configured in combination with the transmitter to transmit to the transmitting communications device an indication of a maximum protocol data unit size that can be transmitted from the communications device acting as the relay device to the infrastructure equipment.

14. A communications device acting as a relay device as claimed in claim 10, wherein the controller is configured in combination with the buffer
to determine from the received indication that all of the protocol data units have been successfully received by the infrastructure equipment, and subsequently
to clear from the buffer each of the protocol data units.

15. A communications device acting as a relay device as claimed in claim 10, wherein the protocol data units are transmitted from the transmitting communications device in a predetermined order and the controller is configured in combination with the transmitted, the receiver and the buffer
to receive from the transmitting communications device, after a predetermined number of the protocol data units have been transmitted by the transmitting communications device, a status request message,
to detect if one or more protocol data units transmitted by the transmitting communications device have not been received by the receiver, and
to transmit to the transmitting communications device, in response to the status request message, an indication of the protocol data units transmitted by the transmitting communications device in the predetermined order which have not been successfully received by the receiver having a sequence number lower than a highest sequence number of protocol data units which have been successfully received.

16. A communications device acting as a relay device as claimed in claim 15, comprising a timer wherein the detection that the protocol data units which have not been received is configured as a time determined by the timer after receiving, a previous one of the protocol data units.

17. A communications device acting as a relay device as claimed in claim 15, wherein the controller is configured in combination with the receiver to receive from the transmitting communications device a re-transmission of the one or more protocol data units transmitted by the transmitting communications device which have not been successfully received, before a next protocol data unit in the predetermined order is received from the transmitting communications device.

18. A communications device acting as a relay device configured to communicate with a transmitting communications device operating with a mobile communications network and a receiving communications device operating with the mobile communications network, the communications device acting as the relay device comprising:
a receiver configured to receive signals representing protocol units formed from one or more service data units via a first wireless access interface from the transmitting communications device according to a first automatic repeat request protocol for transmission to the receiving communications device,
a transmitter configured to transmit signals representing the received protocol data units via a second wireless access interface to the receiving communications device according to a second automatic repeat request protocol,
a controller configured to control the transmitter to transmit the signals and to control the receiver to receive the signals to transmit, and
a buffer configured to store the protocol data units received by the receiver from the transmitting communications device according to the first automatic repeat request protocol, wherein
the controller is configured in combination with the transmitter, the receiver and the buffer to transmit according to the second automatic repeat request protocol the protocol data units received from the transmitting communications device from the buffer to the receiving communications device.

19. A communications device acting as a relay device as claimed in claim 18,
wherein the protocol data units are each transmitted from the transmitting communications device having a sequence number defining their position in a predetermined order, a higher sequence number being transmitted after a lower sequence number,
wherein the buffer comprises a sliding window which represents protocol data units which have been transmitted by transmitting communications device but not yet successfully acknowledged by the receiving communications device, an upper edge of the sliding window being set to a first value equal to a sequence number to be assigned for a next newly generated protocol data unit at the transmitting communications device and a lower edge of the sliding window being set to a second value equal to a sequence number of a next protocol data unit for which a successful acknowledgement is to be received from the receiving communications device in the predetermined order, and the controller is configured in combination with the transmitter, the receiver and the buffer
to receive from the receiving communications device an indication that one or more of the protocol data units have not been successfully received by the receiving communications device,
to retransmit from the buffer the one or more of the protocol data units which have not been successfully received to the receiving communications device, and
to advance the sliding window according to the second value, such that memory of the buffer is freed at locations at which are stored each of the protocol data units in the predetermined order which have been successfully received before the one or more protocol data units which have not been successfully received.

20. A communications device acting as a relay device as claimed in claim 19, wherein the controller is configured to combination with the transmitter to transmit the second value to the transmitting communications device.

* * * * *